US009282311B2

(12) United States Patent
Yamashita et al.

(10) Patent No.: US 9,282,311 B2
(45) Date of Patent: *Mar. 8, 2016

(54) THREE-DIMENSIONAL IMAGE PROCESSING APPARATUS AND THREE-DIMENSIONAL IMAGE PROCESSING METHOD

(71) Applicant: Panasonic Intellectual Property Management Co., Ltd., Osaka-shi, Osaka (JP)

(72) Inventors: Haruo Yamashita, Osaka (JP); Takeshi Ito, Osaka (JP); Hiromichi Ono, Hyogo (JP); Yasuhiro Kuwahara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 197 days.

This patent is subject to a terminal disclaimer.

(21) Appl. No.: 13/929,793

(22) Filed: Jun. 28, 2013

(65) Prior Publication Data
US 2013/0294682 A1 Nov. 7, 2013

Related U.S. Application Data

(63) Continuation-in-part of application No. PCT/JP2011/006390, filed on Nov. 16, 2011.

(30) Foreign Application Priority Data

Jan. 19, 2011 (JP) .................................. 2011-009049

(51) Int. Cl.
*G06K 9/00* (2006.01)
*H04N 13/00* (2006.01)
(Continued)

(52) U.S. Cl.
CPC ............ *H04N 13/0022* (2013.01); *G06T 5/002* (2013.01); *G06T 7/0085* (2013.01);
(Continued)

(58) Field of Classification Search
USPC ......... 382/100, 103, 106–107, 154, 162, 168, 382/173, 181, 194, 199, 219, 232, 254, 260, 382/274–276, 285, 291, 305, 312; 375/240.01; 353/7; 348/51, 47, 252; 359/462; 345/419
See application file for complete search history.

(56) References Cited

U.S. PATENT DOCUMENTS 6,163,337 A 12/2000 Azuma et al.
7,016,519 B1 3/2006 Nakamura et al.
(Continued)

FOREIGN PATENT DOCUMENTS

JP H8-9421 A 1/1996
JP H10-191396 A 7/1998
(Continued)

OTHER PUBLICATIONS

The Office Action from the corresponding Japanese Patent Application No. 2012-553474 issued on Nov. 11, 2014.
(Continued)

*Primary Examiner* — Seyed Azarian
(74) *Attorney, Agent, or Firm* — Shinjyu Global IP

(57) ABSTRACT

In a three-dimensional image capturing apparatus (three-dimensional image processing apparatus), a depth obtainment unit obtains L depth information and R depth information from a three-dimensional image, and an image correction unit executes a smoothing process on an end part region of the subject based on the L depth information and the R depth information. As a result, the three-dimensional image processed by the three-dimensional image processing apparatus is a high-quality three-dimensional image that correctly expresses a sense of three-dimensionality and thickness in the subject and that has a low sense of a cardboard cutout effect.

5 Claims, 14 Drawing Sheets

(51) Int. Cl.
*H04N 13/02* (2006.01)
*G06T 7/00* (2006.01)
*G06T 5/00* (2006.01)
*G06T 15/00* (2011.01)

(52) U.S. Cl.
CPC ....... *H04N13/0018* (2013.01); *H04N 13/0239* (2013.01); *G06T 2207/10012* (2013.01); *G06T 2207/10021* (2013.01); *G06T 2207/20192* (2013.01)

(56) References Cited

U.S. PATENT DOCUMENTS

| | | | |
|---|---|---|---|
| 7,486,804 B2 | 2/2009 | Nakamura et al. | |
| 7,679,641 B2* | 3/2010 | Lipton | H04N 13/0003 345/419 |
| 8,000,521 B2* | 8/2011 | Kira | G02B 27/2228 359/462 |
| 8,774,267 B2* | 7/2014 | Gaddy | G06T 1/0028 375/240.01 |
| 2006/0120595 A1 | 6/2006 | Nakamura et al. | |
| 2006/0158730 A1 | 7/2006 | Kira | |
| 2010/0046802 A1* | 2/2010 | Watanabe | G01S 17/36 382/106 |
| 2011/0007278 A1* | 1/2011 | Huber | G03B 35/18 353/7 |

FOREIGN PATENT DOCUMENTS

| | | |
|---|---|---|
| JP | 2002-123842 A | 4/2002 |
| JP | 2003-47027 A | 2/2003 |
| JP | 2004-260591 A | 9/2004 |
| JP | 2006-42298 A | 2/2006 |
| JP | 3840341 B2 | 11/2006 |

OTHER PUBLICATIONS

Notice of Allowance from the corresponding Japanese Patent Application No. 2012-553474 issued on Apr. 21, 2015.
International Search Report for corresponding International Application No. PCT/JP2011/006390 mailed Feb. 14, 2012.

* cited by examiner

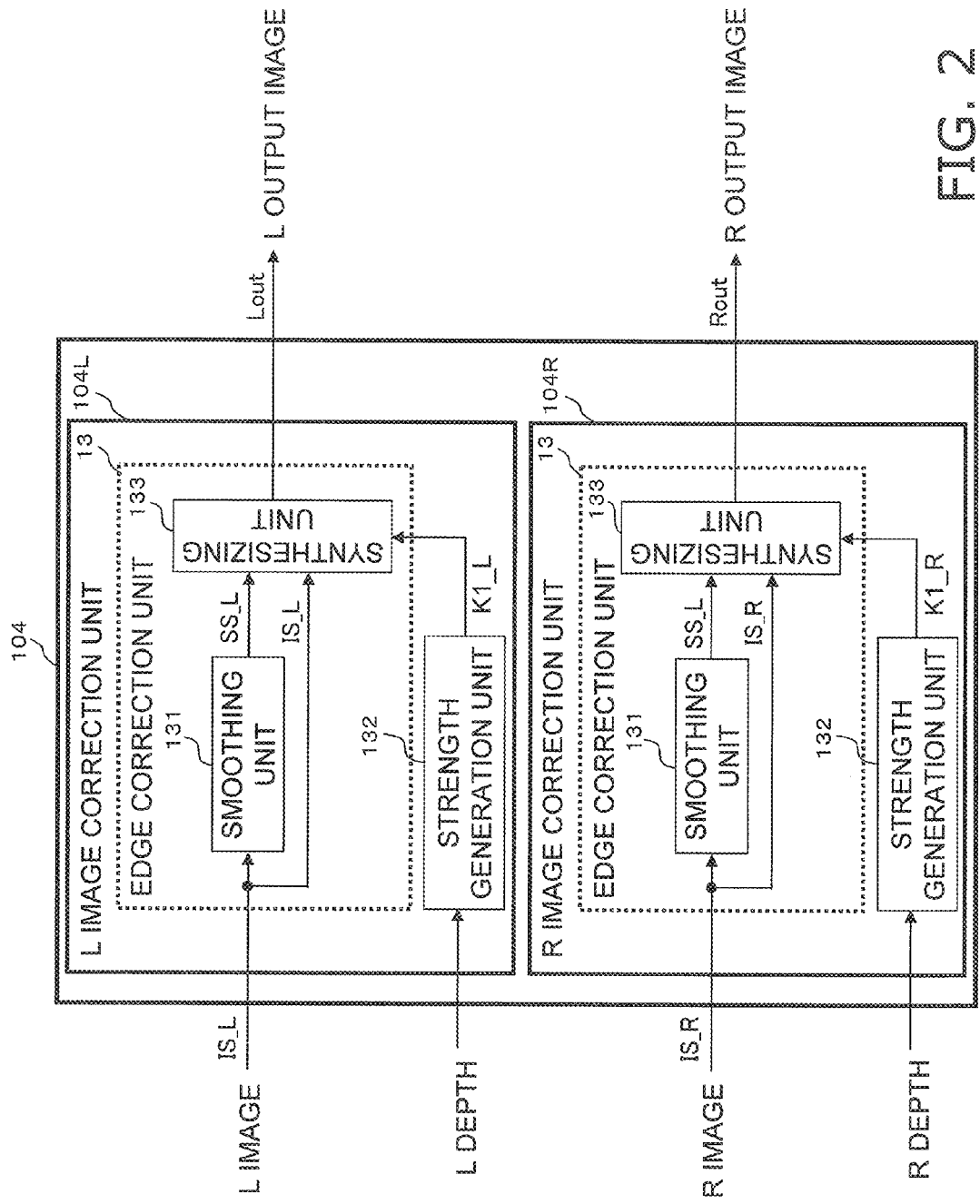

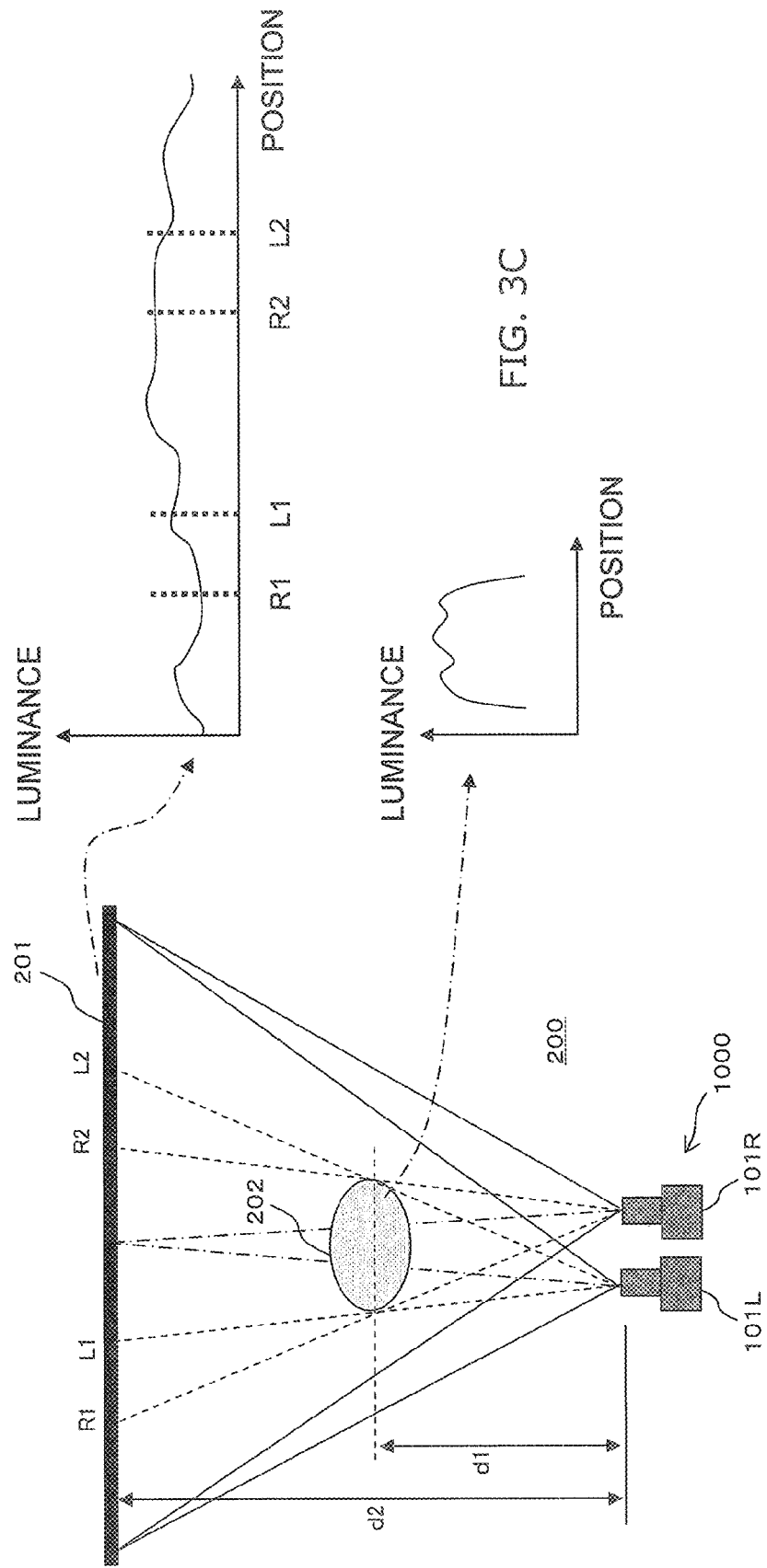

L IMAGE

R IMAGE

THREE-DIMENSIONAL IMAGE PROCESSING APPARATUS AND THREE-DIMENSIONAL IMAGE PROCESSING METHOD

CROSS-REFERENCE TO RELATED APPLICATIONS

This application is a continuation of PCT Application No. PCT/JP2011/006390 filed Nov. 16, 2011 which claims priority to Japanese Application Number 2011-009049 filed Jan. 19, 2011. The entire disclosures of PCT Application No. PCT/JP2011/006390 and Japanese Application Number 2011-009049 are hereby incorporated herein by reference.

BACKGROUND

1. Field of the Invention

The present invention relates to techniques for increasing the quality of a three-dimensional image (a three-dimensional stereoscopic image), and relates to techniques that can be applied in a wide range of devices that handle three-dimensional images (three-dimensional video), such as cameras (image capturing apparatuses) that capture three-dimensional images, display apparatuses that display three-dimensional images (three-dimensional video), image processing apparatuses that process three-dimensional images (three-dimensional video), and so on.

2. Description of the Related Art

Three-dimensional image capturing apparatuses that capture three-dimensional images in a state where binocular disparity is present (that is, capture a left eye image and a right eye image) are known; such apparatuses make it possible to reproduce a three-dimensional image in a display apparatus (called a "three-dimensional display apparatus" hereinafter) capable of projecting the three-dimensional image (the left eye image and the right eye image) independently for the left and right eyes, respectively.

In three-dimensional image capturing, a three-dimensional image (a left eye image and a right eye image) obtained in a state in which a high level of disparity is present in a far scene (a subject in the far scene) or a near scene (a subject in the near scene) will result in an image that exceeds the fusion limit for three-dimensional viewing by a person and is thus difficult to appear as three-dimensional, or an image that produces a sense of fatigue in people who are viewing the three-dimensional image (a tiring image). In order to avoid generating such a poor three-dimensional image, there are techniques that obtain favorable three-dimensional images by performing disparity adjustment, stereo base adjustment (called "SB adjustment" hereinafter), and so on, and such techniques are widely used in professional three-dimensional image capturing for movies and the like.

Disparity adjustment is a technique used primarily in the case where a far scene (a subject in the far scene) exceeds the fusion limit, and adjusting the disparity so that the distance to the far scene is compressed in a nonlinear manner brings the far scene (the subject in the far scene) that was difficult to see three-dimensionally nearer, making it possible to obtain a three-dimensional image that is easy to perceive in three dimensions (a three-dimensional image that can easily be seen in three dimensions).

On the other hand, stereo base adjustment reduces the space between two cameras (a camera for capturing a left eye image and a camera for capturing a right eye image) (that is, reduces the stereo base (interaxial distance)), making it possible to reduce the dynamic range of the disparity. For this reason, capturing a three-dimensional image after performing the stereo base adjustment described above makes it possible to obtain a three-dimensional image in which the entire scene, from the far scene (a subject in the far scene) to the near scene (a subject in the near scene), is within a fusional area.

In addition, even in the case where the three-dimensional image is displayed in a display apparatus at a small size, the disparity of the three-dimensional image (that is, between the left eye image and the right eye image) is reduced, and thus the far scene is compressed. Accordingly, in this case, the three-dimensional image displayed in the small-size display apparatus is a three-dimensional image that is easy to view.

Employing the stated image capturing techniques (disparity adjustment, stereo base adjustment) in three-dimensional image capturing makes it possible to capture a three-dimensional image that is sufficiently easy to view (that is, a three-dimensional image that is easily perceptible in three dimensions) when displaying the image in three dimensions in a predetermined display environment (for example, see Japanese Patent H8-9421A).

However, in the aforementioned conventional technique, a three-dimensional image that is easy to view (that is, a three-dimensional image that is easily perceptible in three dimensions) is obtained by taking the fusion limit for three-dimensional viewing into consideration and reducing the desired disparity (that is, by reducing the disparity from its original value so that the subject that is the target of the three-dimensional image capturing falls within the fusional area for three-dimensional viewing), and is therefore not desirable from the standpoint of obtaining a natural sense of three-dimensionality and depth in the three-dimensional image. Accordingly, three-dimensional images using the aforementioned conventional techniques (techniques employing disparity adjustment and stereo base adjustment) have a problem in terms of the quality of the three-dimensional images.

Techniques employing disparity adjustment can obtain three-dimensional images that are easy to view (that is, that are easily perceptible in three dimensions), but because the distance to the far scene is compressed in a nonlinear manner, a phenomenon in which the far scene appears as a flat plane (that is, a phenomenon in which a sense of thickness in subjects in the far scene is reduced and the subjects appear as flattened three-dimensional images) occurs in three-dimensional images on which disparity adjustment has been performed.

Meanwhile, techniques employing SB adjustment have an overall reduced sense of depth in the three-dimensional images that are obtained (that is, the distance from the closest point to the farthest point is reduced), and thus a phenomenon in which the sense of three-dimensionality of individual subjects is reduced occurs.

Accordingly, the three-dimensional images obtained using any of the aforementioned conventional techniques tend to be images having a poor sense of three-dimensionality and depth, and thus have poor quality.

In addition, there are cases where what is known as a "cardboard cutout effect" occurs due to the compression/reduction in the sense of three-dimensionality arising in the case where the aforementioned conventional techniques are used.

The "cardboard cutout effect" is a phenomenon in which, in a three-dimensional image, the thickness of, for example, a primary subject such as a person in the near scene is reduced, and the subject resembles a flat picture drawn on a board.

If this cardboard cutout effect occurs in a primary subject, which is of high importance, there will be an extreme drop in the quality of the three-dimensional image.

However, the cardboard cutout effect does not occur only due to the compression/reduction in the sense of three-dimensionality arising in three-dimensional images due to the disparity adjustment as in the aforementioned conventional techniques. Depending on the image capturing conditions (image capturing state), the cardboard cutout effect can occur even in ideal, undistorted three-dimensional image capturing (image capturing that captures three-dimensional images with no compression/reduction in the sense of three-dimensionality).

Accordingly, the cardboard cutout effect is a visual phenomenon, and all of the causes of the cardboard cutout effect have not necessarily been clarified. However, regardless of the cause of the cardboard cutout effect occurring, the effect always reduces the quality of three-dimensional images.

Having been achieved in light of the aforementioned problems, it is an object of the present invention to realize a three-dimensional image processing apparatus, a three-dimensional image processing method, and a program that restore a sense of three-dimensionality and thickness to a subject and obtain a high-quality three-dimensional image with a low sense of a cardboard cutout effect, regardless of the causes of the cardboard cutout effect.

SUMMARY

A first aspect of the invention is a three-dimensional image processing apparatus that performs an image correction process on a left eye image and a right eye image contained in a three-dimensional image obtained by a dual-lens technique or a multiple-viewpoint technique, and includes an end part region detection unit and an edge correction unit.

The end part region detection unit detects, from the left eye image and the right eye image, one or both of a region including an edge on a left side of a subject contained in the left eye image and the right eye image and a region including an edge on a right side of the subject contained in the left eye image and the right eye image, as an end part region.

The edge correction unit executes a smoothing process on a region in at least one end part region of the subject detected by the end part region detection unit.

According to this three-dimensional image processing apparatus, the end part region of the subject is detected in the left eye image and/or the right eye image, and a smoothing process is executed on at least one end of the detected end part region of the subject. As a result, according to this three-dimensional image processing apparatus, it is possible to suitably prevent a drop in the quality of a sense of three-dimensionality/sense of depth (for example, a drop in quality caused by a cardboard cutout effect, a phenomenon in which frosted glass appears to follow the subject, and so on) arising due to the end part region of the subject inappropriately undergoing disparity matching in the left eye image and the right eye image.

Accordingly, a three-dimensional image obtained by the three-dimensional image processing apparatus is a high-quality three-dimensional image in which the occurrence of the cardboard cutout effect and so on is suppressed and a sense of three-dimensionality/sense of thickness is restored to the subject.

Note that the "smoothing process" refers to a process for smoothing a signal waveform of an image signal. The "smoothing process" includes, for example, (1) a process for removing high-frequency components, (2) a process for removing shooting effect components, (3) a process for removing ringing effect components, (4) a process for removing jaggy components, and so on from the image signal.

According to a second aspect of the invention, the end part region detection unit includes a depth obtainment unit that obtains, from the left eye image and the right eye image, a left eye distance image and a right eye distance image by obtaining distance information in a three-dimensional space for the subject contained in the left eye image and the right eye image.

Furthermore, the end part region detection unit detects the end part region of the subject in the left eye image and/or the right eye image based on the distance information of the subject obtained by the depth obtainment unit.

According to this three-dimensional image processing apparatus, the end part region of the subject is detected in the left eye image and/or the right eye image based on the distance information (depth value) of the subject, and a smoothing process (for example, a process for removing high-frequency components) is executed on at least one end of the detected end part region of the subject. As a result, according to this three-dimensional image processing apparatus, it is possible to suitably prevent a drop in the quality of a sense of three-dimensionality/sense of depth (for example, a drop in quality caused by a cardboard cutout effect, a phenomenon in which frosted glass appears to follow the subject, and so on) arising due to the end part region of the subject inappropriately undergoing disparity matching in the left eye image and the right eye image.

Accordingly, a three-dimensional image obtained by the three-dimensional image processing apparatus is a high-quality three-dimensional image in which the occurrence of the cardboard cutout effect and so on is suppressed and a sense of three-dimensionality/sense of thickness is restored to the subject.

Note that "distance information in a three-dimensional space" refers to, for example, a distance from a point (an image capturing point) in a three-dimensional space that corresponds to a first point of view (for example, a left eye point of view when obtaining the left eye image) or a second point of view (for example, a right eye point of view when obtaining the right eye image) from which it is assumed the left eye image or the right eye image is captured in three dimensions, to a point in the three-dimensional space (an image capturing space in which it is assumed the left eye image or the right eye image is captured in three dimensions) that corresponds to a first pixel that is a pixel in the left eye image and a second pixel that is a pixel in the right eye image and that corresponds to the first pixel.

Meanwhile, "distance information in a three-dimensional space for the subject" (distance information that is information regarding the distance of the subject) refers to information that has correlation with the subject distance.

The "subject distance" refers to the distance from an object that is focused upon the surface of an image sensor in an image capturing unit (for example, a CCD image sensor, a CMOS image sensor, or the like) to a camera (that is, the three-dimensional image capturing apparatus), and includes the concepts of object point distance and conjugate distance (distance between objects). Furthermore, the "subject distance" is a concept including the approximate distance from the three-dimensional image capturing apparatus to the subject, and is a concept including, for example, (1) the distance from the center of gravity of the overall lens (a first point of view lens and/or a second point of view lens) in the optical system of the three-dimensional image capturing apparatus to the subject, (2) the distance from the surface of the image sensor in the image capturing unit to the subject, (3) the distance from the center of gravity (or the center) of the three-dimensional image capturing apparatus to the subject, (4) the distance from a line segment that connects the first point of view and the second point of view to the subject, and so on.

According to a third aspect of the invention, the end part region detection unit includes an edge extraction unit that extracts, from the left eye image and the right eye image, an edge of the subject contained in the left eye image and the right eye image.

Furthermore, the end part region detection unit detects the end part region of the subject in the left eye image and/or the right eye image based on edge information of the left eye image and the right eye image extracted by the edge extraction unit.

According to this three-dimensional image processing apparatus, the end part region of the subject is detected in the left eye image and/or the right eye image based on the edge of the subject extracted by the edge extraction unit, and a smoothing process (for example, a process for removing high-frequency components) is executed on at least one end of the detected end part region of the subject. As a result, according to this three-dimensional image processing apparatus, it is possible to suitably prevent a drop in the quality of a sense of three-dimensionality/sense of depth (for example, a drop in quality caused by a cardboard cutout effect, a phenomenon in which frosted glass appears to follow the subject, and so on) arising due to the end part region of the subject inappropriately undergoing disparity matching in the left eye image and the right eye image.

Accordingly, a three-dimensional image obtained by the three-dimensional image processing apparatus is a high-quality three-dimensional image in which the occurrence of the cardboard cutout effect and so on is suppressed and a sense of three-dimensionality/sense of thickness is restored to the subject.

According to a fourth aspect of the invention, the end part region detection unit detects the region including an edge on the left side of the subject as a left end part region and furthermore detects the region including an edge on the right side of the subject as a right end part region.

Furthermore, the edge correction unit:
(1) executes a smoothing process on the left end part region in the left eye image; and
(2) executes a smoothing process on the right end part region in the right eye image.

According to this three-dimensional image processing apparatus, a smoothing process (for example, a process for removing high-frequency components) is executed on regions that easily become occluded regions, and thus edge areas are blurred in regions that easily become occluded regions. As a result, according to this three-dimensional image processing apparatus, it is possible to suitably prevent a drop in the quality of a sense of three-dimensionality/sense of depth (for example, a drop in quality caused by a cardboard cutout effect, a phenomenon in which frosted glass appears to follow the subject, and so on) arising due to the end part region of the subject inappropriately undergoing disparity matching in the left eye image and the right eye image.

Accordingly, a three-dimensional image obtained by the three-dimensional image processing apparatus is a high-quality three-dimensional image in which the occurrence of the cardboard cutout effect and so on is suppressed and a sense of three-dimensionality/sense of thickness is restored to the subject.

According to a fifth aspect of the invention, the end part region detection unit detects the region including an edge on the left side of the subject as a left end part region and furthermore detects the region including an edge on the right side of the subject as a right end part region.

Furthermore, the edge correction unit:
(1) executes a smoothing process on the left end part region in the left eye image at a first strength and executes a smoothing process on the right end part region in the left eye image at a second strength that is a lower strength than the first strength; and
(2) executes a smoothing process on the right end part region in the right eye image at a third strength and executes a smoothing process on the left end part region in the right eye image at a fourth strength that is a lower strength than the third strength.

According to this three-dimensional image processing apparatus, a stronger smoothing process (for example, a process for removing high-frequency components) is executed on regions that easily become occluded regions, and thus edge areas are blurred more strongly in regions that easily become occluded regions than edge areas in regions that do not easily become occluded regions. As a result, according to this three-dimensional image processing apparatus, it is possible to suitably prevent a drop in the quality of a sense of three-dimensionality/sense of depth (for example, a drop in quality caused by a cardboard cutout effect, a phenomenon in which frosted glass appears to follow the subject, and so on) arising due to the end part region of the subject inappropriately undergoing disparity matching in the left eye image and the right eye image.

Accordingly, a three-dimensional image obtained by the three-dimensional image processing apparatus is a high-quality three-dimensional image in which the occurrence of the cardboard cutout effect and so on is suppressed and a sense of three-dimensionality/sense of thickness is restored to the subject.

A sixth aspect of the invention is a three-dimensional image processing method that performs an image correction process on a left eye image and a right eye image contained in a three-dimensional image obtained by a dual-lens technique or a multiple-viewpoint technique. The following processes are executed in the three-dimensional image processing method.

(1) A process for detecting, from the left eye image and the right eye image, one or both of a region including an edge on a left side of a subject contained in the left eye image and the right eye image and a region including an edge on a right side of the subject contained in the left eye image and the right eye image, as an end part region.

(2) A process for smoothing a region in at least one end part region of the subject that has been detected.

Through this, it is possible to achieve an image processing method that achieves the same effects as the first aspect of the invention.

According to the present invention, a sense of three-dimensionality and thickness can be restored to a subject and a high-quality three-dimensional image with a low sense of a cardboard cutout effect can be obtained, regardless of the cause of the cardboard cutout effect.

BRIEF DESCRIPTION OF THE DRAWINGS

FIG. 2 is a block diagram illustrating an image correction unit 104 according to the first embodiment.

FIG. 3A, FIG. 3B, and FIG. 3C are a descriptive diagram illustrating an image capturing environment and a subject.

DETAILED DESCRIPTION

Figure 1:
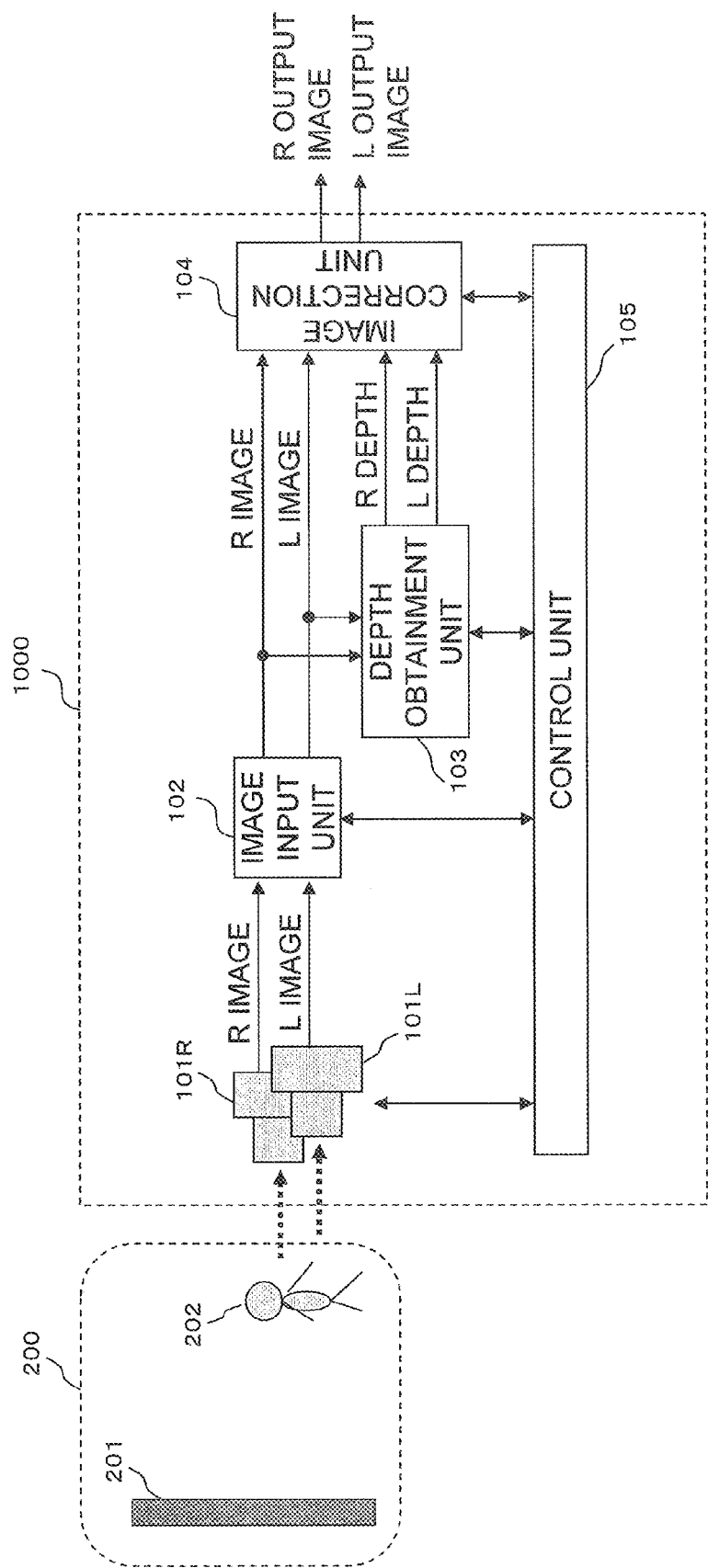
FIG. 1 is a block diagram illustrating the overall configuration of a three-dimensional image capturing apparatus 1000 according to a first embodiment, including an image capturing environment (a captured scene).

Embodiments of the present invention will be described hereinafter with reference to the drawings. It will be apparent to those skilled in the art from this disclosure that the following descriptions of the embodiments are provided for illustration only and not for the purpose of limiting the invention as defined by the appended claims and their equivalents First Embodiment The first embodiment will describe a dual-lens three-dimensional image capturing apparatus (digital camera, video camera, or the like) as an example of a three-dimensional image processing apparatus.

Generally speaking, an R image and an L image obtained by capturing a subject three-dimensionally are obtained after first executing aperture correction (edge enhancement) on those images during camera signal processing. In normal two-dimensional images, a slight ringing effect (due to overshoot, undershoot, or the like) has little negative influence on the image quality and can increase a sense of high resolution in the two-dimensional image, and is therefore actively used as an image quality enhancement process in two-dimensional images.

However, if this processing, which is useful for two-dimensional images, is carried out on a three-dimensional image (R image and L image) obtained through three-dimensional imaging by a three-dimensional image capturing apparatus, the processed three-dimensional image (R image and L image) will have unnatural edge lines surrounding the target object as a subject, and can consequently appear to be a synthesized image. As a result, a three-dimensional image (R image and L image) on which such processing has been carried out becomes a three-dimensional image having an extremely strong cardboard cutout effect.

Even in the case where there is no clear ringing effect in a three-dimensional image (R image and L image), the image will nevertheless have a strong cardboard cutout effect when the three-dimensional image (R image and L image) is displayed three-dimensionally in the case where the three-dimensional image (R image and L image) contains strong edges having what is known as binary contrast, where the definition is high and the edges have a sharp luminance curve, the case where a process for enhancing the definition has been performed on the three-dimensional image (R image and L image) and as a result the three-dimensional image (R image and L image) contains edges with jaggies due to the occurrence of aliasing, or other such cases.

As is clear from these descriptions, the demands on the edges of a target object differ between three-dimensional images and two-dimensional images.

The present embodiment provides a solution for the aforementioned problems. In other words, the present embodiment aims to solve the aforementioned problems by performing, on a three-dimensional image (R image and L image), a process for smoothing edges in a border region of a target object, a process for eliminating jaggies, a process for eliminating a ringing effect in the vicinity of the edges, eliminating shooting effects (overshoot, undershoot, and so on), and the like and correcting the edges so that the edges are more suitable for a three-dimensional image.

1.1: Configuration of Three-Dimensional Image Capturing Apparatus

FIG. 1 is a schematic diagram illustrating the configuration of a three-dimensional image capturing apparatus 1000 according to the first embodiment. Note that FIG. 1 schematically illustrates both the three-dimensional image capturing apparatus 1000 and a scene 200 captured by the three-dimensional image capturing apparatus 1000 (that is, a captured scene 200).

As shown in FIG. 1, the three-dimensional image capturing apparatus 1000 includes a first image capturing unit 101R that obtains a first image signal (for example, a right eye image signal (an R image signal)) by collecting subject light from a first point of view, a second image capturing unit 101L that obtains a second image signal (for example, a left eye image signal (an L image signal)) by collecting subject light from a second point of view, and an image input unit 102 that converts the first image signal (for example, the R image signal) and the second image signal (for example, the L image signal) into respective digital signals.

In addition, the three-dimensional image capturing apparatus 1000 includes a depth obtainment unit 103 that calculates subject distance information based on the respective first image signal (for example, the R image signal) and second image signal (for example, the L image signal) converted into digital signals and outputs the calculated information as first depth information (for example, R depth information) and second depth information (for example, L depth information), and an image correction unit 104 that performs an image correction process on the first image signal (for example, the R image signal) and the second image signal (for example, the L image signal) using the first depth information (for example, R depth information) and the second depth information (for example, L depth information).

In addition, the three-dimensional image capturing apparatus 1000 includes, as shown in FIG. 1, a control unit 105 that controls the aforementioned functional units. Note that the control unit 105 may be connected directly to the functional units of the three-dimensional image capturing apparatus 1000, or may be connected to the functional units via a bus.

Note that for the sake of simplicity, the following descriptions will be given assuming that a right eye image (video) is captured by the first image capturing unit 101R and a left eye image (video) is captured by the second image capturing unit 101L.

The first image capturing unit 101R includes an optical system disposed at the first point of view that collects subject light and an image sensor that obtains the first image signal (right eye image signal (R image signal)) by photoelectrically converting the collected subject light. The first image capturing unit 101R then outputs the obtained first image signal (R image signal) to the image input unit 102.

The second image capturing unit 101L includes an optical system disposed at the second point of view, corresponding to a different location than the first point of view, that collects subject light and an image sensor that obtains the second image signal (left eye image signal (L image signal)) by photoelectrically converting the collected subject light. The second image capturing unit 101L then outputs the obtained second image signal (L image signal) to the image input unit 102.

The image input unit 102 is inputted with the first image signal (R image signal) obtained by the first image capturing unit 101R, performs A/D conversion on the inputted first image signal, and outputs the A/D-converted first image signal (R image signal) to the depth obtainment unit 103 and the image correction unit 104.

The image input unit 102 is also inputted with the second image signal (L image signal) obtained by the second image capturing unit 101L, performs A/D conversion on the inputted second image signal, and outputs the A/D-converted second image signal (L image signal) to the depth obtainment unit 103 and the image correction unit 104.

The depth obtainment unit 103 is inputted with the first image signal (R image signal) and the second image signal (L image signal) outputted from the image input unit 102. From a first image (R image) formed based on the first image signal (R image signal) and a second image (L image) formed based the second image signal (L image signal), the depth obtainment unit 103 obtains the first depth information (R depth information) that is depth information of the first image (R image) and the second depth information (L depth information) that is depth information of the second image (L image). The depth obtainment unit 103 then outputs the obtained first depth information (R depth information) and second depth information (L depth information) to the image correction unit 104.

Note that it is preferable for the depth information to be obtained through, for example, disparity matching.

As shown in FIG. 2, the image correction unit 104 includes an L image correction unit 104L and an R image correction unit 104R. The image correction unit 104 is inputted with the first image signal (R image signal) and the second image signal (L image signal) outputted from the image input unit 102, and the first depth information (R depth information) and the second depth information (L depth information) outputted from the depth obtainment unit 103. The image correction unit 104 carries out a correction process on the first image signal (R image signal) based on the first depth information (R depth information) and outputs the corrected first image signal (R image signal). Furthermore, the image correction unit 104 carries out a correction process on the second image signal (L image signal) based on the second depth information (L depth information) and outputs the corrected second image signal (L image signal).

As shown in FIG. 2, the L image correction unit 104L includes an edge correction unit 13 and the strength generation unit 132.

The edge correction unit 13 includes a smoothing unit 131 and a synthesizing unit 133, as shown in FIG. 2.

The smoothing unit 131 is inputted with a second image signal (L image signal) IS_L outputted from the image input unit 102, and performs a smoothing process on the inputted second image signal (L image signal) IS_L. The smoothing unit 131 then outputs a smoothed second image signal (L image signal) SS_L to the synthesizing unit 133.

The synthesizing unit 133 is inputted with the second image signal (L image signal) IS_L outputted from the image input unit 102, the smoothed second image signal (L image signal) SS_L outputted from the smoothing unit 131, and a strength signal K1_L outputted from the strength generation unit 132. The synthesizing unit 133 synthesizes the second image signal (L image signal) IS_L and the smoothed second image signal (L image signal) SS_L based on the strength signal K1_L, and outputs the synthesized signal as a second image signal (L image signal) Lout.

The strength generation unit 132 is inputted with the second depth information (L depth information) outputted from the depth obtainment unit 103, and generates the strength signal K1_L from the second depth information (L depth information). The strength generation unit 132 then outputs the generated strength signal K1_L to the synthesizing unit 133 of the edge correction unit 13.

The L image correction unit 104L is thus configured in such a manner.

Note that the R image correction unit 104R has a similar configuration as the L image correction unit 104L, and differs from the L image correction unit 104L only in that the inputted signals are the R image signal and the R depth information.

As shown in FIG. 1, the control unit 105 is connected to the first image capturing unit 101R, the second image capturing unit 101L, the image input unit 102, the depth obtainment unit 103, and the image correction unit 104 so as to be capable of exchanging required signals in both directions therewith. The control unit 105 controls the aforementioned functional units of the three-dimensional image capturing apparatus 1000 using predetermined control signals (driving signals, synchronization signals, and so on) so that signal processes on the R image signal and the L image signal, data read/write processes, and so on are executed at predetermined timings.

Note that an "end part region detection unit" is realized by the depth obtainment unit 103 and the strength generation unit 132 of the L image correction unit 104L when processing the L image and by the depth obtainment unit 103 and the strength generation unit 132 of the R image correction unit 104R when processing the R image.

1.2: Operations of Three-Dimensional Image Capturing Apparatus

Operations of the three-dimensional image capturing apparatus 1000 configured as described thus far will be described hereinafter.

In FIG. 1, the captured scene 200 includes a far scene 201 and a near scene 202. The near scene 202 corresponds to a primary subject. Operations performed by the three-dimensional image capturing apparatus 1000 using the case where the three-dimensional image capturing apparatus 1000 captures the captured scene shown in FIG. 1 (the captured scene shown in FIG. 3) in three dimensions as an example will now be described.

FIG. 3 is a diagram schematically illustrating (an example of) a relationship between an image capturing environment and a subject in the case where three-dimensional image capturing is carried out using the three-dimensional image capturing apparatus 1000, illustrating the captured scene shown in FIG. 1 from above. FIG. 3A is a diagram illustrating the image capturing environment (captured scene) 200, and the first image capturing unit 101R and the second image capturing unit 101L, from above. In the image capturing environment (captured scene) 200, a primary subject 202 in the near scene and a subject 201 in the far scene are in a positional relationship such as that illustrated in FIG. 3A. Although the subject 201 in the far scene is illustrated, for the sake of simplicity, as being a wall or the like on which a picture is drawn, it should be noted that the subject is not limited to such a subject, and it goes without saying that the subject may be any exemplary subject.

FIG. 3B illustrates a luminance distribution of the picture drawn on the subject 201 in the far scene, whereas FIG. 3C illustrates a frontal luminance distribution of the primary subject 202 in the near scene as seen from the three-dimensional image capturing apparatus 1000 (a camera).

Note that in FIG. 3B and (c), the horizontal axis represents a position in the horizontal direction, whereas the vertical axis represents luminance.

Note that for the sake of simplicity, an angle of convergence is set so that a center line of the angle of view captured by the first image capturing unit 101R of the three-dimensional image capturing apparatus 1000 (that is, a dot-dash line extending from 101R in FIG. 3A) and a center line of the angle of view captured by the second image capturing unit 101L (a dot-dash line extending from 101L in FIG. 3A) intersect at a distance (d2) at which the far scene 201 is located.

In addition, it is assumed that the near scene 202 (primary subject 202) is, for example, an object having a three-dimensional roundness (for example, an approximately oval-shaped object having a predetermined width when viewed from above (such as a person)).

Furthermore, although the angle of convergence has been set as described above for the sake of simplicity, the angle of convergence is not limited thereto and may be set to another angle.

Subject light from the captured scene 200 is collected by the first image capturing unit 101R disposed at the first point of view, and is converted into the first image signal (R image signal) by the image sensor in the first image capturing unit 101R. Likewise, subject light from the captured scene 200 is collected by the second image capturing unit 101L disposed at the second point of view, and is converted into the second image signal (L image signal) by the image sensor in the second image capturing unit 101L.

Note that the first image capturing unit 101R and the second image capturing unit 101L are disposed at a distance equivalent to an interaxial distance (stereo base length) so that the three-dimensional image capturing apparatus 1000 can obtain a three-dimensional image (a left eye image and a right eye image).

The first image signal (R image signal) outputted from the first image capturing unit 101R and the second image signal (L image signal) outputted from the second image capturing unit 101L are respectively inputted into the image input unit 102 and converted into digital signals by the image input unit 102. The first image signal (R image signal) and second image signal (L image signal) that have been converted into digital signals are then outputted to the depth obtainment unit 103 and the image correction unit 104.

From the first image (R image) formed based on the first image signal (R image signal) and the second image (L image) formed based the second image signal (L image signal), the depth obtainment unit 103 obtains the first depth information (R depth information) that is depth information of the first image (R image) and the second depth information (L depth information) that is depth information of the second image (L image) through, for example, disparity matching.

Here, a method for obtaining the first depth information (R depth information) and the second depth information (L depth information) through disparity matching will be described using FIG. 4.

Figure 4A:
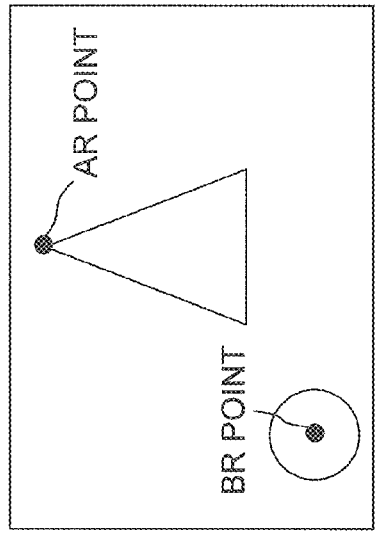
FIG. 4A, FIG. 4B, and FIG. 4C are a diagram illustrating a method for obtaining first depth information (R depth information) and second depth information (L depth information) through disparity matching.
Figure 4B:
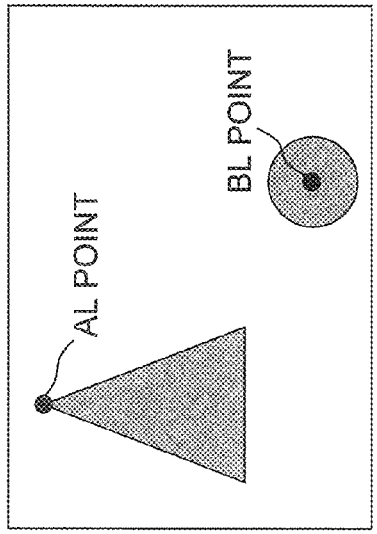
Figure 4C:
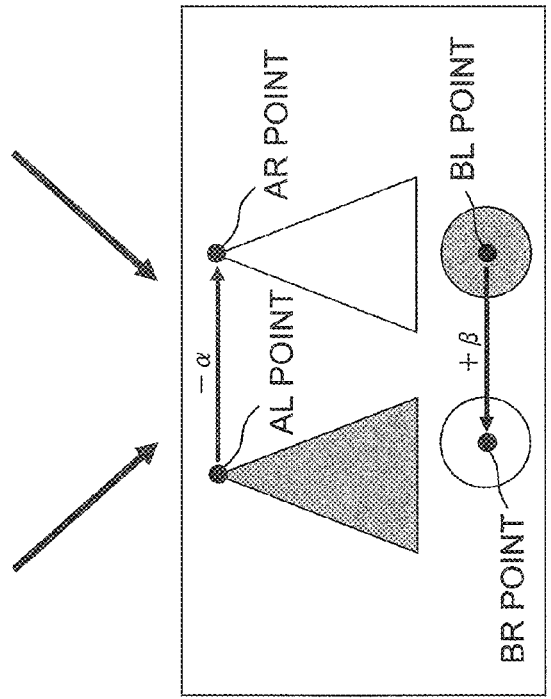

FIG. 4 is a diagram schematically illustrating a three-dimensional image produced when capturing a captured scene, in which a triangular object is disposed in the far scene and a circular object is disposed in the near scene, in three dimensions using the three-dimensional image capturing apparatus 1000. FIG. 4A is a diagram schematically illustrating the L image (left eye image), FIG. 4B is a diagram schematically illustrating the R image (right eye image), and FIG. 4C is a diagram illustrating the R image and the L image being overlapped and displayed as a single image.

The method for obtaining the first depth information (R depth information) and the second depth information (L depth information) through disparity matching is realized, for example, by executing the processes described in the following (1) through (3).

(1) First, the depth obtainment unit 103 uses the L image (left eye image) and the R image (right eye image) to detect that, for example, a subject A corresponding to a point AL in the L image shown in FIG. 4A (that is, the apex of the triangle in FIG. 4) corresponds to a point AR in the R image shown in FIG. 4B.

(2) Then, a skew amount (disparity) Diff(A) between the two detected points, or the point AL and the point AR, is calculated.

Note that the disparity has a positive/negative symbol depending on the direction of the skew. This is, for example, positive in the case where the point in the R image is skewed to the left relative to the point in the L image, and negative when the reverse is true.

For example, in the case of FIG. 4, if it is assumed that an absolute value of the disparity for the subject A is $\alpha$ ($\geq 0$), the AR point in the R image is skewed to the right of the AL point in the L image, and thus the disparity for the subject A is calculated as "$-\alpha$". Likewise, if it assumed that an absolute value of the disparity for a subject B (the center point of the circle in FIG. 4) is $\beta$ ($\geq 0$), a BR point in the R image is skewed to the left of a BL point in the L image, and thus the disparity for the subject B is calculated as "$+\beta$".

(3) The depth obtainment unit 103 carries out the processes of (1) and (2) for all points (all pixels) in the image, and obtains a disparity image that takes the calculated skew amounts (disparities) as pixel values. Then, a disparity image obtained using the disparities calculated for the respective pixels in the L image as pixel values is taken as the L depth information (an L depth information image (a left eye image distance image)), and a disparity image obtained using the disparities calculated for the respective pixels in the R image as pixel values is taken as the R depth information (an R depth information image (a right eye image distance image)).

For example, with the L depth information (L depth information image (left eye image distance image)), the value of the pixel corresponding to the AL point in the L image shown in FIG. 4A is −α, which is the disparity of the subject A, whereas with the R depth information (R depth information image (right eye image distance image)), the value of the pixel corresponding to the AR point in the R image shown in FIG. 4B is −α, which is the disparity of the subject A.

Note that "distance image" refers to an image in which for each pixel, a value having correlation with the distance between the actual location of the subject corresponding to each pixel (that is, a location within a three-dimensional space) and the location of the three-dimensional image capturing apparatus 1000 is mapped.

Note that the method for obtaining the first depth information (R depth information) and the second depth information (L depth information) through disparity matching is merely an example, and the method is not limited thereto. For example, the stated symbols for the disparities may be reversed. In addition, the depth obtainment unit 103 may obtain the left eye image distance image and the right eye image distance image, and may obtain the L depth information and the R depth information, using another method.

The L depth information and the R depth information obtained as described above are respectively outputted to the image correction unit 104.

1.2.1: Operations of Image Correction Unit 104

Next, operations performed by the image correction unit 104 will be described.

The L image correction unit 104L executes processing on the L image using the L depth information and the R image correction unit 104B executes processing on the R image using the R depth information. Because the details of those processes are the same, the following descriptions will focus on the L image correction unit 104L.

First, operations performed by the strength generation unit 132 of the L image correction unit 104L will be described.

Figure 5:
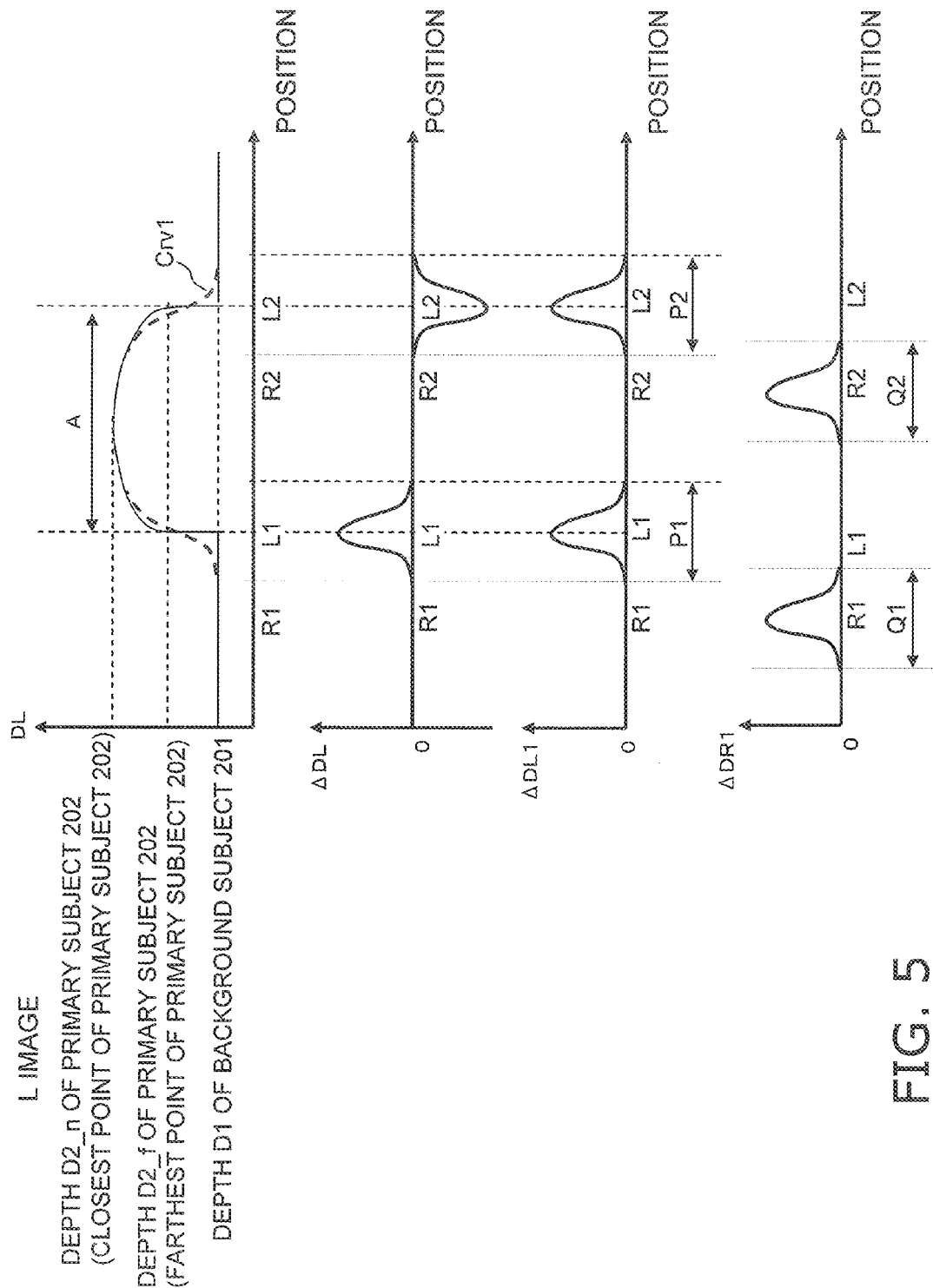
FIG. 5 is a diagram illustrating a signal waveform in a strength generation unit 132 according to the first embodiment.

FIG. 5 is a diagram illustrating operations performed by the strength generation unit 132. In the uppermost section of FIG. 5, the horizontal axis represents a location in the horizontal direction and the vertical axis represents a value of the L depth information. In other words, DL in the uppermost section of FIG. 5 indicates depth information (distance information) of the L image for a pixel location in the L image, and expresses the depth information (distance information) of the L image provided from the depth obtainment unit 103. Here, DL takes on a lower value for further distances (that is, greater subject distances), and takes on a higher value for closer distances (that is, lower subject distances).

Accordingly, as shown in the uppermost section of FIG. 5, the depth information (distance information) of the primary subject 202 has a higher value than the depth information (distance information) of the far scene subject 201. Meanwhile, as shown in the uppermost section of FIG. 5, the value of the L depth information of the primary subject 202 takes on a value in a range from D2_f to D2_n. In other words, the value of the L depth information at the closest point of the primary subject 202 is D2_n, and the value of the L depth information at the farthest point of the primary subject 202 is D2_f. Meanwhile, because the far scene subject 201 is a flat wall, the L depth information of the far scene subject 201 is a constant D1.

Figure 6:
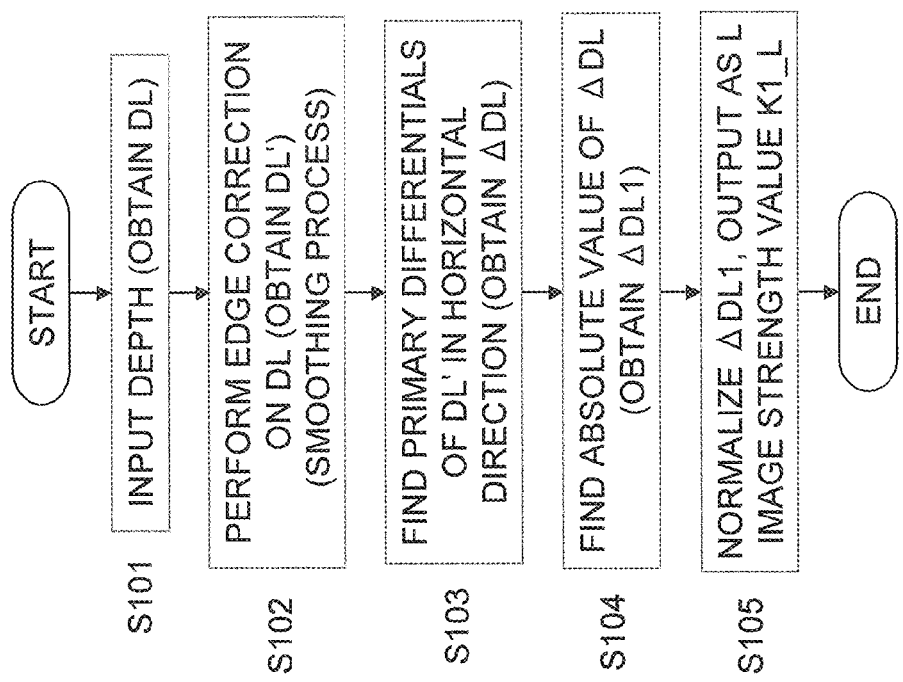
FIG. 6 is a flowchart illustrating processing performed by the strength generation unit according to the first embodiment.

Operations performed by the strength generation unit 132 will be described using FIG. 5 and the flowchart shown in FIG. 6.

(S101, S102):

The strength generation unit 132 obtains an edge-corrected L depth value DL' (this corresponds to a curve Crv1 in FIG. 5) by performing an edge correction process (for example, an LPF process) on the inputted L depth information (L depth value) (that is, by performing a smoothing process).

(S103):

The strength generation unit 132 obtains an L depth differential signal ΔDL by finding differentials (differences) for the horizontal locations (that is, the values in the X axis direction in FIG. 5) of the edge-corrected L depth value DL'. Note that the process of S103 needs not be a process for finding differentials (differences); as long as the process can detect an amount of change in the edge-corrected L depth value DL', the process may be executed instead of a process for finding differentials (differences).

(S104):

The strength generation unit 132 obtains an L depth differential absolute value signal ΔDL1 by finding the absolute value of the L depth differential signal ΔDL.

(S105):

The strength generation unit 132 outputs, to the edge correction unit 13 (the synthesizing unit 133), a signal obtained by normalizing the obtained L depth differential absolute value signal ΔDL1 (for example, a signal normalized to a range of [0:1]) as the L image strength signal K1_L.

Through this, the three-dimensional image capturing apparatus 1000 can accurately detect the vicinity of edges having different depth values (that is, edges formed by subjects having different depth values) using the L image strength signal K1_L generated by the strength generation unit 132.

Note that the bandwidth of the L depth differential absolute value signal ΔDL1 that detects a region including edges (this corresponds to bands indicated by P1 and P2 in FIG. 5, and in the case of an R depth differential absolute value signal ΔDR1, corresponds to bands indicated by Q1 and Q2 in FIG. 5) can be adjusted using the properties of a low-pass filter applied to the L depth signal (L depth value) DL.

Next, operations performed by the edge correction unit 13 of the L image correction unit 104L will be described.

The smoothing unit 131 of the edge correction unit 13 executes a smoothing process on the L image signal IS_L outputted from the image input unit 102. In the present embodiment, the smoothing unit 131 is, for example, a low-pass filter, and executes an LPF process as the smoothing process. Through this, the L image signal SS_L processed by the smoothing unit 131 becomes a signal in which edge parts have been smoothed (a smoothed signal (for example, a signal from which high-frequency components have been removed, a signal from which shooting effects have been removed, a signal from which ringing effects have been removed, a signal from which jaggies have been removed, and so on)).

Note that the smoothing process performed by the smoothing unit 131 is not limited to an LPF process, and may be, for example, a process performed using a median filter. In other words, any processing that tends to smooth the edges may be executed by the smoothing unit 131 as the smoothing process, and as long as the smoothing process performed by the smoothing unit 131 is a process that can execute such processing (that is, processing that tends to blur the edges), any process may be used. Note that it is effective to employ processing combining a median filter, useful in removing fine jaggies having large changes in amplitude, with a standard low-pass filter, as the smoothing process performed by the smoothing unit 131.

The L image signal SS_L on which the smoothing unit 131 has executed the smoothing process is outputted to the synthesizing unit 133.

The synthesizing unit 133 synthesizes the L image signal IS_L and the L image signal SS_L on which the smoothing process has been executed using, for example, the L image strength signal K1_L, which is a signal that has been normalized in the range of [0:1], as an internal division ratio, and consequently obtains an output L image signal Lout. In other words, the synthesizing unit 133 obtains the output L image signal Lout by executing a process corresponding to:

$$Lout=(1-K1\_L) \times IS\_L + K1\_L \times SS\_L$$

Through this, the L image signal Lout outputted from the synthesizing unit 133 becomes (1) a smoothed image signal at edge parts formed between subjects having different depth values (that is, an image signal on which a smoothing process has been executed) and (2) an image signal outputted from the image input unit in other areas (that is, an image signal on which a smoothing process has not been executed).

Note that the same processing as described above is executed on the R image signal as well, by the R image correction unit 104R.

As a result, the three-dimensional image processed by the three-dimensional image capturing apparatus 1000 becomes a three-dimensional image in which only areas near edges are selectively blurred.

Note that the amount of the blurring obtained through the smoothing process performed by the smoothing unit 131 (for example, a low-pass filtering process) is set in accordance with the value of the strength signal K1_L. Accordingly, because the amount of the smoothing increases toward regions in the vicinity of edges, a three-dimensional image from which jaggies, shooting effects (overshoot, undershoot, and the like), and so on have been effectively removed from edge regions can be obtained through the processing performed by the three-dimensional image capturing apparatus 1000.

Figure 7:
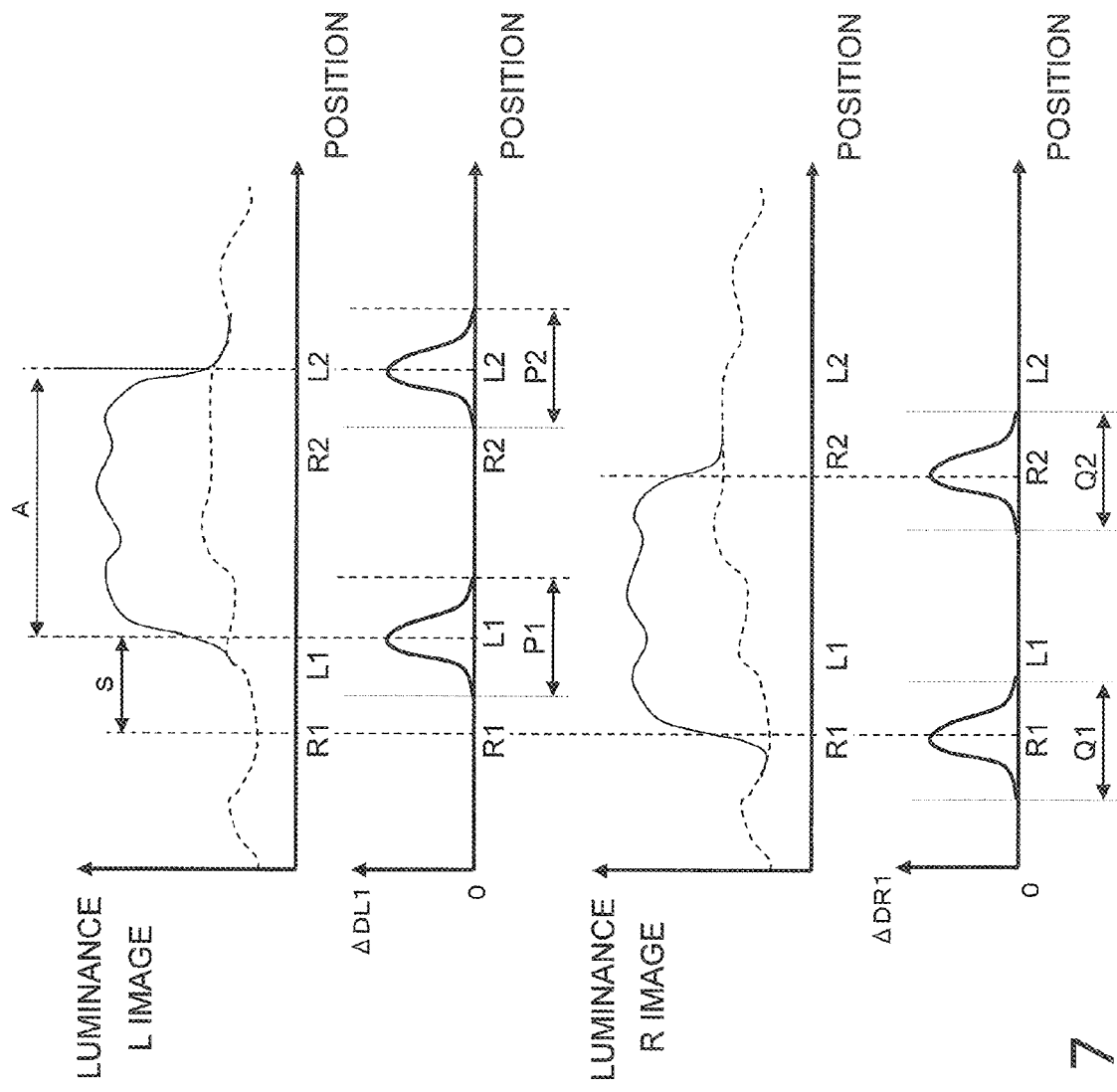
FIG. 7 is a diagram illustrating a result of processing performed by a three-dimensional image capturing apparatus according to the first embodiment.

A processing result obtained in the case where the three-dimensional image capturing apparatus 1000 has performed the aforementioned processing is illustrated in FIG. 7.

As can be seen from FIG. 7, in areas near the left and right edges of the primary subject 202 in the L image (the regions indicated by P1 and P2 in FIG. 7), a smoothing process is executed at a strength based on the strength signal K1_L (the value of ΔDL1) (that is, a high-strength smoothing process is executed in the vicinity of locations L1 and L2).

Meanwhile, in areas near the left and right edges of the primary subject 202 in the R image (the regions indicated by Q1 and Q2 in FIG. 7), a smoothing process is executed at a strength based on a strength signal K1_R (the value of ΔDR1) (that is, a high-strength smoothing process is executed in the vicinity of locations R1 and R2).

The three-dimensional image (L image and R image) whose edges have been appropriately corrected by the three-dimensional image capturing apparatus 1000 according to the present embodiment in this manner is a three-dimensional image in which unnaturalness at the edges of the subject has been reduced, and when displayed in three dimensions, elements that are recognized as strange synthesized images have been effectively reduced. As a result, the three-dimensional image obtained by the three-dimensional image capturing apparatus 1000 is a natural, high-quality three-dimensional image, with little cardboard cutout effect, when displayed in three dimensions.

Although the above describes an example in which the edge correction unit 13 is configured of the smoothing unit 131 and the synthesizing unit 133, it should be noted that the embodiment is not limited thereto, and the edge correction unit 13 may be realized, for example, as a low-pass filter with a variable cutoff frequency. In this case, the low-pass filter with a variable cutoff frequency is controlled by the strength signals K2 (K2_L or K2_R). In other words, in this case, the output image is obtained by executing a filtering process on the input images (L image or R image) having lowered the cutoff frequency only in the vicinity of edge regions based on the strength signals K2 (K2_L or K2_R). Through this, only regions in the vicinity of edges in the three-dimensional image (that is, edge regions formed by subjects having different depth values) can be selectively smoothed, and thus the same effects as those described above can be achieved.

Variation

Next, a variation on the present embodiment will be described.

The foregoing describes the three-dimensional image capturing apparatus 1000 according to the first embodiment as being capable of correcting edge areas in a three-dimensional image to a natural state of blurriness by removing ringing effects, jaggies, and the like in the edge areas by appropriately correcting the edges, thus being capable of obtaining a three-dimensional image in which a cardboard cutout effect has been reduced.

However, when performing an image correction process on a three-dimensional image, it is not easy to set the amount of blurring appropriately; if the image correction process is carried out with a low amount of blurring, the ringing effect and the like will remain, whereas if the image correction process is carried out with an excessive amount of blurring, the edge areas will be excessively blurred.

Figure 8:
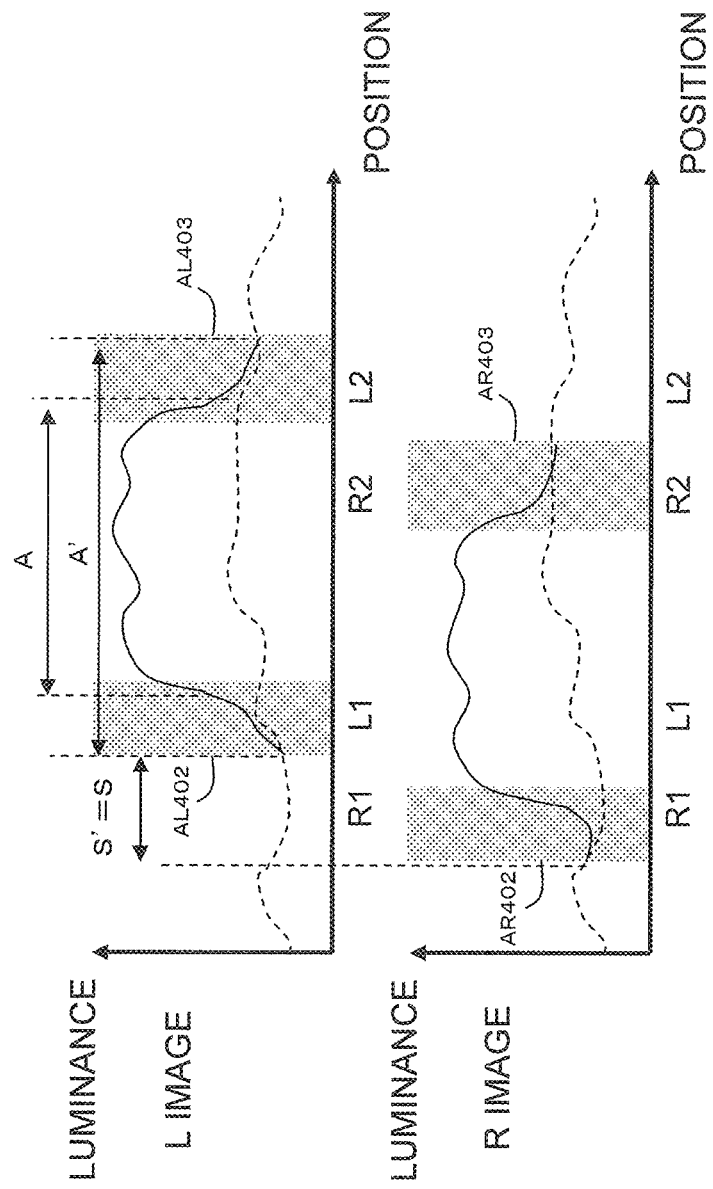
FIG. 8 is a diagram illustrating an example of a processing result in which an edge has been excessively blurred in a three-dimensional image obtained by capturing a captured scene 200 three-dimensionally.

FIG. 8 is a diagram illustrating (an example of) a processing result in which an edge has been excessively smoothed in a three-dimensional image obtained by capturing the scene 200 three-dimensionally.

As shown in FIG. 8, the shaded edge regions indicate ranges in which the edges have been excessively smoothed. An "excessively blurred state" refers to a signal expressing a luminance value of the end of the primary subject 202 being smoothed with some of the luminance of the end of the primary subject 202 bleeding into the far scene 201 (for example, a loss of high-frequency components).

When such an image is viewed in three dimensions, the far scene in ranges around the edges of the subject (ranges indicated by AL402, AL403, AR402, and AR403 in FIG. 8) are smoothed (for example, have a loss of high frequency components), and as a result, it becomes difficult to use the pattern of the far scene for disparity matching. Accordingly, when the three-dimensional image shown in FIG. 8 is displayed in three dimensions, there will be a visual sense that the blurred far scenes around the edges of the L image and the R image are matched. As a result, even regions of the blurred far scene outside of the edge areas of the subject will be recognized as having the same disparity as the subject (that is, will be recognized as having the same disparity as the disparity of the primary subject 202), and the region indicated by A' in FIG. 8 will be recognized as part of the near scene (that is, as part of the primary subject 202).

If such a three-dimensional image is displayed in three dimensions, there will be a visual sense of frosted glass following the edge areas of the subject, in which a blurred far scene appears.

If part of the far scene follows the periphery of the near scene (the primary subject 202) in this manner, when the image is displayed in three dimensions, the near scene (the primary subject 202) will appear flat, exacerbating the cardboard cutout effect, in the same manner as with a three-dimensional image in which a ringing effect has occurred.

In other words, in the case where a ringing effect is removed from edges in order to reduce the cardboard cutout effect when performing an image correction process on a three-dimensional image, the ringing effect will remain if the blurring is insufficient, whereas if the blurring is excessive, a new cardboard cutout effect will be produced by the excess blurring. It is thus difficult to ensure a consistently stable process when performing image correction processing on three-dimensional images.

The present variation solves the aforementioned problems.

The configuration of the three-dimensional image capturing apparatus according to the present variation is the same as the configuration of the three-dimensional image capturing apparatus 1000 according to the first embodiment.

With the three-dimensional image capturing apparatus according to the present variation, the strength signal generated by the strength generation unit 132 of the image correction unit 104 differs from that in the three-dimensional image capturing apparatus 1000 according to the first embodiment.

The strength generation unit 132 of the L image correction unit 104L in the three-dimensional image capturing apparatus according to the present variation outputs an L image second strength signal K2_L instead of the L image strength signal K1_L in the first embodiment.

The strength generation unit 132 of the R image correction unit 104R in the three-dimensional image capturing apparatus according to the present variation outputs an R image second strength signal K2_R instead of the R image strength signal K1_R in the first embodiment.

Note that in the present variation, elements that are identical to those in the three-dimensional image capturing apparatus 1000 according to the first embodiment are assigned the same reference numerals, and detailed descriptions thereof will be omitted.

Figure 9:
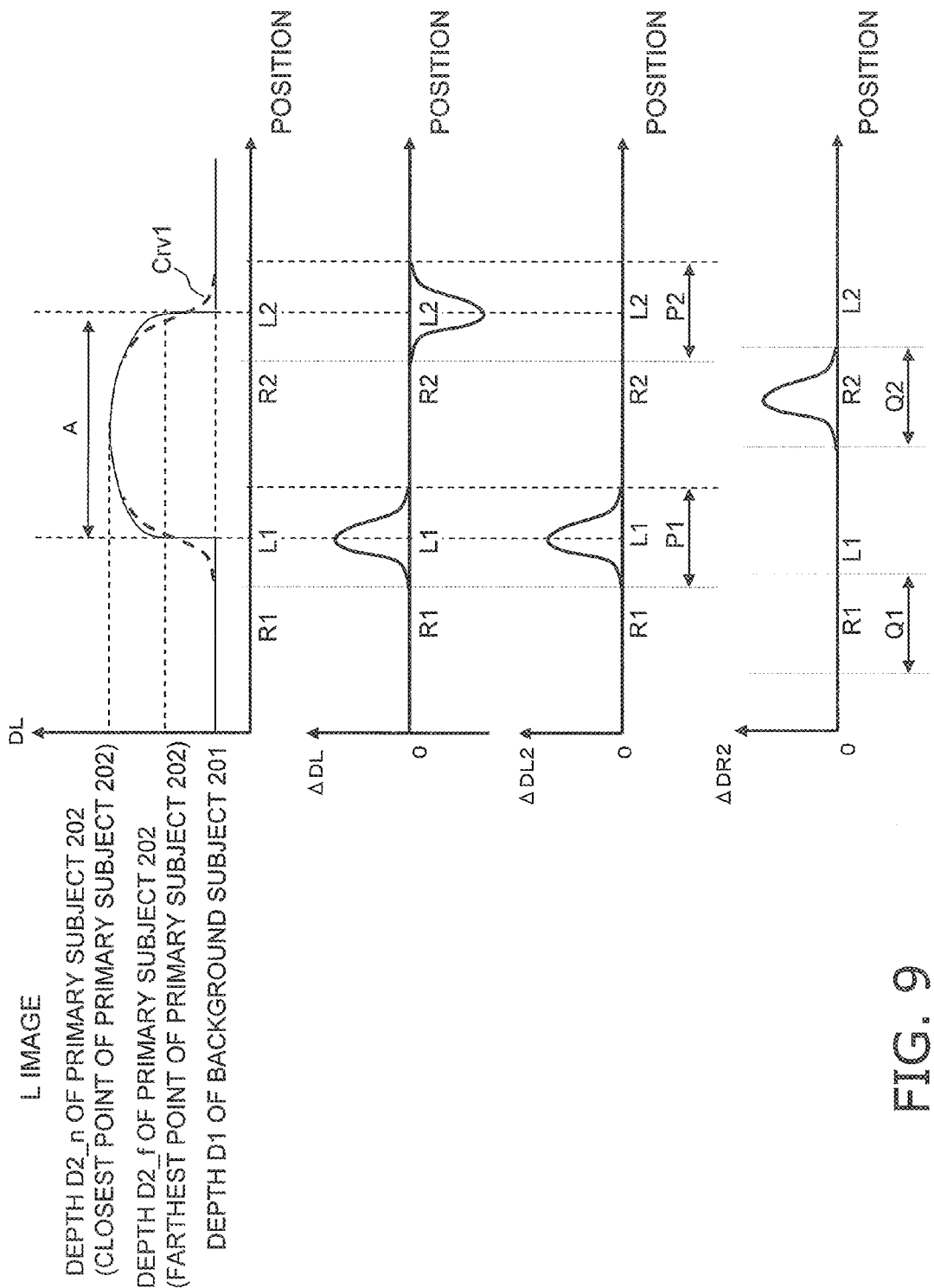
FIG. 9 is a diagram illustrating a signal waveform of a strength generation unit 132 according to a variation on the first embodiment.

FIG. 9 is a waveform diagram illustrating processing performed by the strength generation unit 132 according to the present variation, and illustrates the L depth signal (L depth value) DL, the edge-corrected L depth signal (edge-corrected L depth value) DL', the L depth differential signal ΔDL, a second L depth differential absolute value signal ΔDL2, and a second R depth differential absolute value signal ΔDR2.

Note that in FIG. 9, the L depth signal (L depth value) DL and the L depth differential signal ΔDL are L image signals, and are the same as those shown in FIG. 5.

The second L depth differential absolute value signal ΔDL2 is a signal for generating the L image second strength signal K2_L, and the L image second strength signal K2_L is a signal in which the second L depth differential absolute value signal ΔDL2 has been normalized (for example, a signal normalized in the range of [0:1]).

The second R depth differential absolute value signal ΔDR2 is a signal for generating the R image second strength signal K2_R, and the R image second strength signal K2_R is a signal in which the second R depth differential absolute value signal ΔDR2 has been normalized (for example, a signal normalized in the range of [0:1]).

Meanwhile, the second L depth differential absolute value signal ΔDL2 is a signal obtained by removing areas in which the signal value is negative and leaving only areas in which the signal value is positive in the L depth signal ΔDL shown in FIG. 5 (the signal may include areas in which the signal value is 0).

The L image strength generation unit 132 generates the L image second strength signal K2_L by normalizing the second L depth differential absolute value signal ΔDL2 (for example, normalizing in the range of [0:1]), and outputs the generated L image second strength signal K2_L to the L image edge correction unit 13.

Meanwhile, the second R depth differential absolute value signal ΔDR2 is a signal generated by the R image strength generation unit 132, and is a signal generated through the following processing.

(1) Taking an R depth differential signal ΔDR, which is the R image signal corresponding to the L depth differential signal ΔDL in FIG. 5, the signal value of that signal is positive-negative inverted.

(2) Areas in which the signal value is negative are removed and only areas in which the signal value is positive are left in the signal obtained through the process (1). Through this, the R image strength generation unit 132 generates the R depth differential signal ΔDR.

The R image strength generation unit 132 generates the R image second strength signal K2_R by normalizing the second R depth differential absolute value signal ΔDR2 (for example, normalizing in the range of [0:1]), and outputs the generated R image second strength signal K2_R to the R image edge correction unit 13.

As shown in FIG. 9, in the present variation, the L image second strength signal K2_L (second L depth differential absolute value signal ΔDL2) is produced only in the vicinity of the edge area on the left end of the subject (the primary subject 202), whereas the R image second strength signal K2_R (second R depth differential absolute value signal ΔDR2) is produced only in the vicinity of the edge area on the right end of the subject (the primary subject 202).

Figure 10B:
FIG. 10A and FIG. 10B are flowcharts illustrating processing performed by the strength generation unit according to the variation on the first embodiment.
Figure 10A:
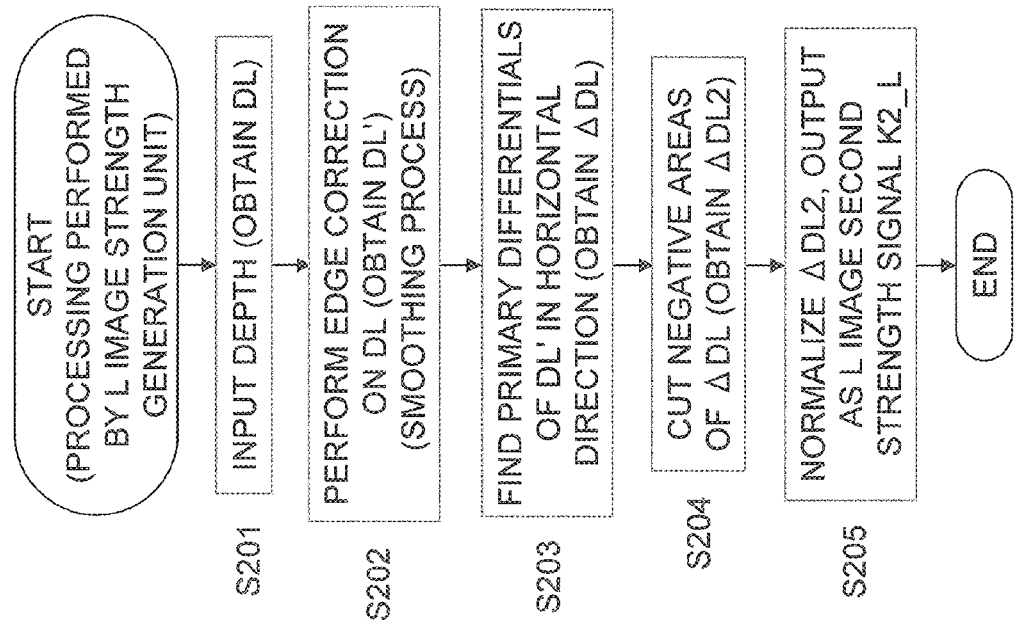

FIG. 10 is a flowchart illustrating processing performed by the strength generation unit 132 according to the present variation. FIG. 10A is a flowchart illustrating processing performed by the L image strength generation unit 132, whereas FIG. 10B is a flowchart illustrating processing performed by the R image strength generation unit 132.

The processes performed by the strength generation unit 132 according to the present variation will be described using FIG. 10.

First, processes performed by the L image strength generation unit 132 will be described using FIG. 10A.

(S201, S202):

The strength generation unit 132 obtains the edge-corrected L depth value DL' (this corresponds to a curve Crv1 in FIG. 9) by performing an edge correction process (for example, an LPF process) on the inputted L depth information (L depth value) (that is, by performing a smoothing process).

(S203):

The strength generation unit 132 obtains the L depth differential signal ΔDL by finding differentials (differences) for the horizontal locations (that is, the values in the X axis direction in FIG. 9) of the edge-corrected L depth value DL'. Note that the process of S203 needs not be definitely a process for finding differentials (differences); as long as the process can detect an amount of change in the edge-corrected L depth value DL', the process may be executed instead of a process for finding differentials (differences).

(S204):

The strength generation unit 132 obtains the second L depth differential absolute value signal ΔDL2 by removing the signal at areas where the signal value is negative from the L depth differential signal ΔDL (that is, setting the signal value of the areas where the signal value is negative to 0).

(S205):

The strength generation unit 132 outputs, to the edge correction unit 13 (the synthesizing unit 133), a signal obtained by normalizing the obtained second L depth differential absolute value signal ΔDL2 (for example, a signal normalized to a range of [0:1]) as the L image strength signal K2_L.

Next, processes performed by the R image strength generation unit 132 will be described using FIG. 10B.

(S301, S302):

The strength generation unit 132 obtains an edge-corrected R depth value DR' by performing an edge correction process (for example, an LPF process) on the inputted R depth information (R depth value) (that is, by performing a smoothing process).

(S303):

The strength generation unit 132 obtains the R depth differential signal ΔDR by finding differentials (differences) for the horizontal locations (that is, the values in the X axis direction and FIG. 9) of the edge-corrected R depth value DR'. Note that the process of S303 needs not be definitely a process for finding differentials (differences); as long as the process can detect an amount of change in the edge-corrected R depth value DR', the process may be executed instead of a process for finding differentials (differences).

(S304):

The strength generation unit 132 (1) obtains a signal in which the signal values of the R depth differential signal ΔDR have been positive-negative inverted. Then, (2) the strength generation unit 132 obtains the second R depth differential absolute value signal ΔDR2 by removing parts of the signal in which the signal value is negative from the positive-negative inverted signal (that is, setting the signal value of the areas where the signal value is negative to 0).

(S305):

The strength generation unit 132 outputs, to the edge correction unit 13 (the synthesizing unit 133), a signal obtained by normalizing the obtained second R depth differential absolute value signal ΔDR2 (for example, a signal normalized to a range of [0:1]) as the R image strength signal K2_R.

Through this, the L image strength signal K2_L is generated by the L image strength generation unit 132 according to the present variation, and the R image strength signal K2_R is generated by the R image strength generation unit 132 according to the present variation.

Then, the L image edge correction unit 13 blurs only edge areas on the left of the subject (the primary subject 202) using the strength signal K2_L generated by the strength generation unit 132. In other words, the synthesizing unit 133 generates the output L image signal Lout by executing a process corresponding to the following formula, using the strength signal K2_L as an internal division ratio.

$$Lout = (1 - K2\_L) \times IS\_L + K2\_L \times SS\_L$$

Meanwhile, the R image edge correction unit 13 blurs only edge areas on the right of the subject (the primary subject 202) using the strength signal K2_R generated by the strength generation unit 132. In other words, the synthesizing unit 133 generates an output R image signal Rout by executing a process corresponding to the following formula, using the strength signal K2_R as an internal division ratio.

$$Rout = (1 - K2\_R) \times IS\_R + K2\_R \times SS\_R$$

In other words, with the three-dimensional image capturing apparatus according to the present variation, (1) a process for blurring only the edge areas on the left of the subject (the primary subject 202) is executed in the L image and (2) a process for blurring only the edge areas on the right of the subject (the primary subject 202) is executed in the R image, based on the function of the second strength signals K2 (K2_L and K2_R).

Figure 11:
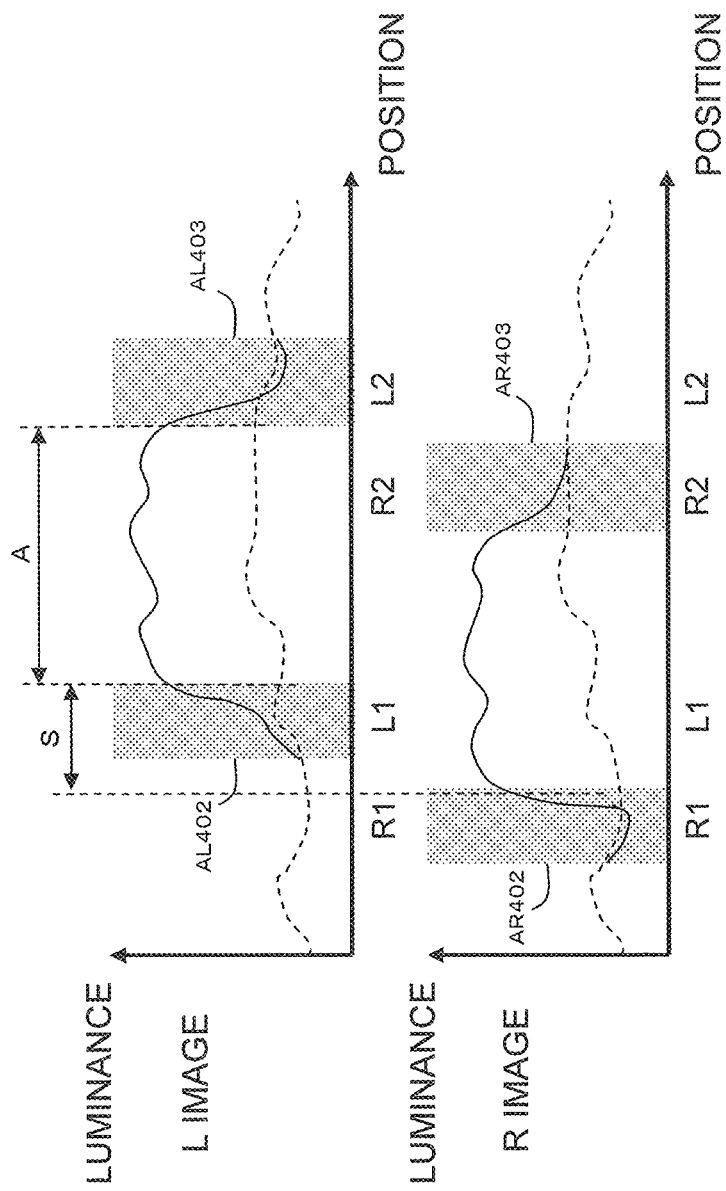
FIG. 11 is a diagram illustrating a result of processing performed by a three-dimensional image capturing apparatus according to a variation on the first embodiment.

FIG. 11 is a diagram showing waveforms obtained after the processing performed by the three-dimensional image capturing apparatus according to the present variation.

As can be seen in FIG. 11, (1) in the L image, only the edge areas on the left of the subject (the primary subject 202) are blurred, whereas (2) in the R image, only the edge areas on the right of the subject (the primary subject 202) are blurred.

Accordingly, as described above, when a three-dimensional image obtained by the three-dimensional image capturing apparatus according to the present variation is displayed in three dimensions, regions in the vicinity of the edges of the subject (the primary subject 202) are not inappropriately matched. As a result, the three-dimensional image obtained by the three-dimensional image capturing apparatus according to the present variation is a three-dimensional image in which the occurrence of a cardboard cutout effect or the like is suppressed and that is capable of appropriately reproducing a sense of three-dimensionality and a sense of depth.

Although the above descriptions discuss, for the sake of simplicity, a case in which only the edge areas on the left of the subject (the primary subject 202) are blurred in the L image and only the edge areas on the right of the subject (the primary subject 202) are blurred in the R image, it should be noted that the variation is not limited thereto.

For example, the three-dimensional image capturing apparatus according to the present variation may perform processing such as that described below.

(1) In the L image, the edge areas on the left of the subject (the primary subject 202) are highly blurred (blurred at a first strength) and the edge areas on the right of the subject (the primary subject 202) are more weakly blurred (blurred at a second strength that is weaker than the first strength).

(2) In the R image, the edge areas on the right of the subject (the primary subject 202) are highly blurred (blurred at a third strength) and the edge areas on the left of the subject (the primary subject 202) are more weakly blurred (blurred at a fourth strength that is weaker than the third strength).

Figure 12:
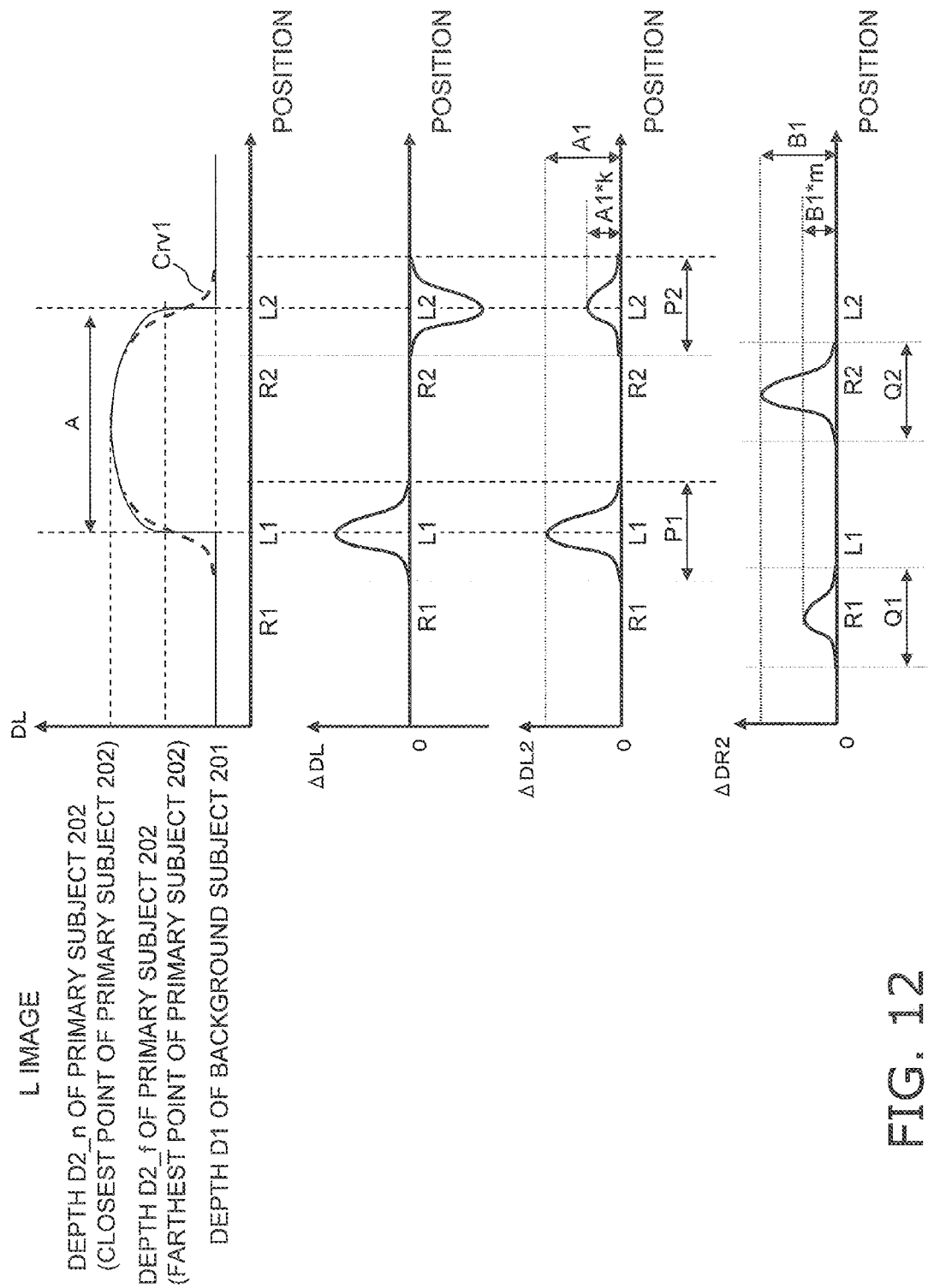
FIG. 12 is a diagram illustrating a signal waveform in a strength generation unit 132 according to a variation on the first embodiment.

FIG. 12 is a diagram illustrating waveforms of the L depth signal (L depth value) DL, the edge-corrected L depth signal (the edge-corrected L depth value) DL', the L depth differential signal ΔDL, the second L depth differential absolute value signal ΔDL2, and the second R depth differential absolute value signal ΔDR2, in the case with the aforementioned processing is performed.

As shown in FIG. 12, (1) In the L image, the peak value of the strength signal K1_L in the edge area on the right of the subject (the primary subject 202) (that is, the region P2) is k (where 0≤k≤1) times the peak value of the strength signal K1_L in the edge area on the left of the subject (the primary subject 202) (that is, the region P1).

(2) In the R image, the peak value of the strength signal K1_R in the edge area on the left of the subject (the primary subject 202) (that is, the region Q1) is m (where 0≤m≤1) times the peak value of the strength signal K1_R in the edge area on the right of the subject (the primary subject 202) (that is, the region Q2).

Accordingly, with the three-dimensional image capturing apparatus according to the present variation, when the edge correction unit 13 executes processing using the aforementioned strength signals K1, (1) In the L image, the edge areas on the left of the subject (the primary subject 202) can be highly blurred (blurred at a first strength) and the edge areas on the right of the subject (the primary subject 202) can be more weakly blurred (blurred at a second strength that is weaker than the first strength), and (2) In the R image, the edge areas on the right of the subject (the primary subject 202) can be highly blurred (blurred at a third strength) and the edge areas on the left of the subject (the primary subject 202) can be more weakly blurred (blurred at a fourth strength that is weaker than the third strength).

By executing processing in the manner described above, in a three-dimensional image obtained by the three-dimensional image capturing apparatus according to the present variation, the region AR402 in the R image is not significantly blurred; as a result, the blurred region AL402 in the L image and the region AR402 in the R image are not matched, and thus are not sensed as being in the near scene.

Meanwhile, the far scene of the blurred region AL402 in the L image is originally a region that is highly likely to be an occluded region (that is, the far scene in the corresponding position is not present in the R image), and is thus a region that does not have a component for stereo matching and whose sense of distance is indefinite Accordingly, in the case where a three-dimensional image that has been processed as described above by the three-dimensional image capturing apparatus according to the present variation is displayed in three dimensions, a side effect caused by blurring the left end area of the object serving a subject in the L image is difficult to perceive.

Likewise, in the three-dimensional image obtained by the three-dimensional image capturing apparatus according to the present variation, the region AL403 in the L image is not significantly blurred; as a result, the blurred region AR403 in the R image and the region AL403 in the L image are not matched, and thus are not sensed as being in the near scene.

Furthermore, the far scene of the blurred region AR403 in the R image is also originally a region that is highly likely to be an occluded region, and is thus a region that does not undergo stereo matching and whose sense of distance is indefinite.

Accordingly, in the case where a three-dimensional image that has been processed as described above by the three-dimensional image capturing apparatus according to the present variation is displayed in three dimensions, a side effect caused by blurring the right end area of the object serving a subject in the R image is difficult to perceive.

As described thus far, with the three-dimensional image capturing apparatus according to the present variation, as long as the state of the blurring (the extent of the blurring) on the left and right sides of the subject (for example, the primary subject 202) are set to be different, it is possible to avoid unsuitable disparity matching (that is, that unsuitable image regions will be recognized as the same subject due to disparity matching), and as a result, it is possible to appropriately prevent the occurrence of the cardboard cutout effect and the like.

In other words, with the three-dimensional image capturing apparatus according to the present variation, it is simply necessary to set the state of the blurring (the extent of the blurring) on the left and right sides of the subject (for example, the primary subject 202) to be different, and thus there is less of a demand for precision in a filtering process carried out during the smoothing process. In other words, with the three-dimensional image capturing apparatus according to the present variation, the margin for the extent of the filtering process can be increased in the smoothing process. As a result, with the three-dimensional image capturing apparatus according to the present variation, a simple and stable image correction process can be executed on the three-dimensional image.

Although the present embodiment illustrates an example in which the luminance of the primary subject 202 is higher than the luminance of the far scene 201, it should be noted that the embodiment is not limited thereto. That is, the details and effects of the processing performed by the three-dimensional image capturing apparatus 1000 according to the present embodiment and the three-dimensional image capturing apparatus according to the variation on the present embodiment have no relation to the luminance of the subject.

Second Embodiment

Next, a second embodiment will be described.

Figure 13:
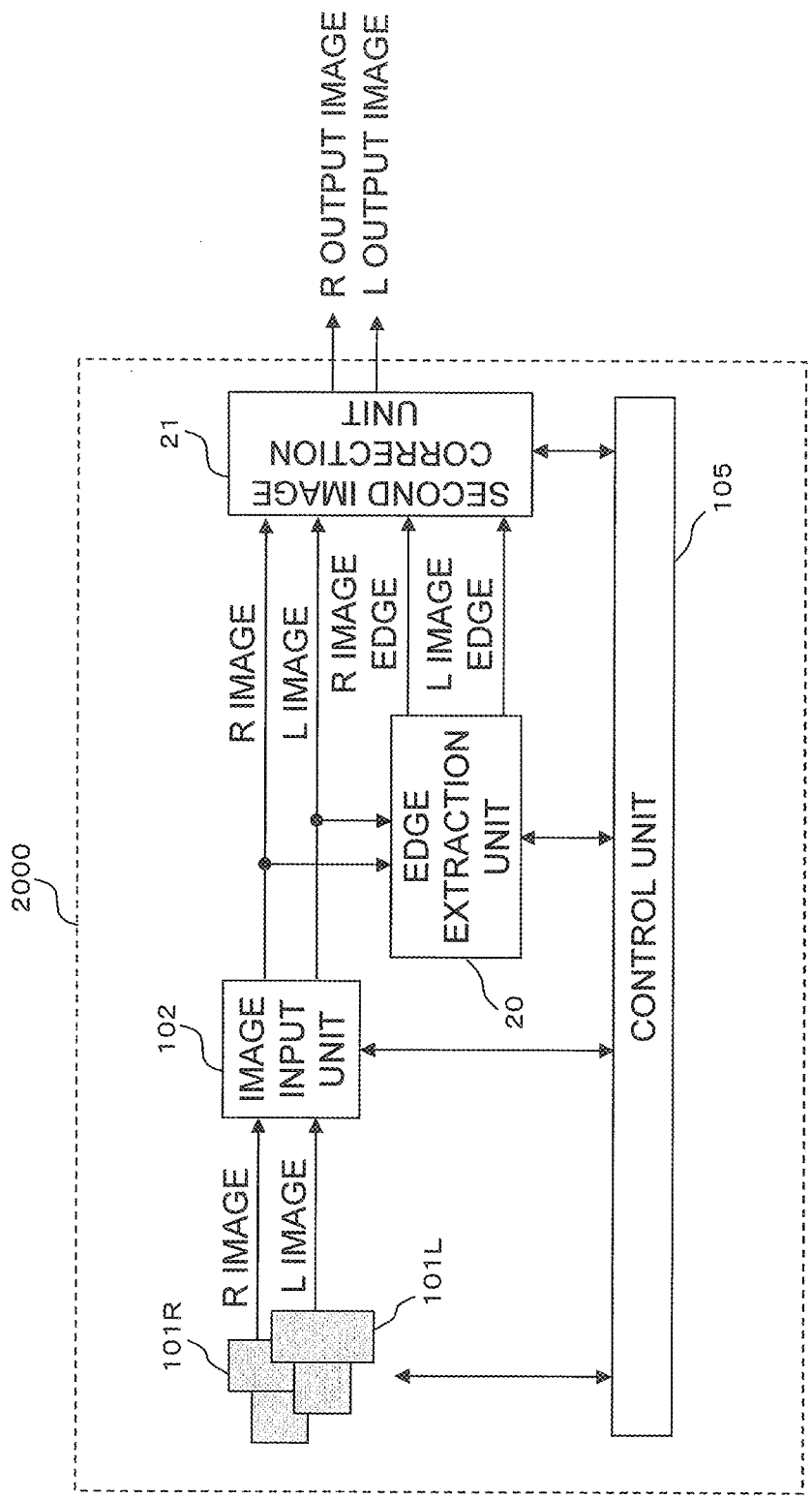
FIG. 13 is a block diagram illustrating the overall configuration of a three-dimensional image capturing apparatus 1000 according to a second embodiment.

A three-dimensional image capturing apparatus (three-dimensional image processing apparatus) 2000 according to the second embodiment is a three-dimensional image capturing apparatus (three-dimensional image processing apparatus) having the same effects and purpose as that described in the first embodiment, and FIG. 13 illustrates the overall configuration of the three-dimensional image capturing apparatus 2000 according to the present embodiment.

The three-dimensional image capturing apparatus 2000 according to the present embodiment has the configuration of the three-dimensional image capturing apparatus 1000 according to the first embodiment, except that the depth obtainment unit 103 has been replaced with an edge extraction unit 20 and the image correction unit 104 has been replaced with a second image correction unit 21. These points represent the differences between the three-dimensional image capturing apparatus 2000 according to the present embodiment and the three-dimensional image capturing apparatus 1000 according to the first embodiment, and aside from these differences, the three-dimensional image capturing apparatus 2000 according to the present embodiment is the same as the three-dimensional image capturing apparatus 1000 according to the first embodiment.

Note that in the present embodiment, elements that are identical to those of the first embodiment are assigned the same reference numerals, and detailed descriptions thereof will be omitted.

The edge extraction unit 20 is inputted with the R image and the L image outputted from the image input unit 102. The edge extraction unit 20 extracts edge components of the subject from the R image and the L image outputted from the image input unit 102. The edge extraction unit 20 outputs information regarding the edge components extracted through a process that will be described later (that is, an L image common edge image) to a second strength generation unit 22 in an L image correction unit 21L of the second image correction unit 21, and outputs information regarding the edge components extracted through a process that will be described later (that is, an R image common edge image) to a second strength generation unit 22 in an R image correction unit 21R of the second image correction unit 21.

Note that the "information regarding the extracted edge components" refers to a concept that includes, for example, an edge component-extracted image obtained by extracting edge components from an image (for example, an edge-detected image), an image signal that forms such an edge component-extracted image (for example, an edge-detected image), and so on.

The edge extraction unit 20 performs an edge extraction process by detecting primarily an amount of change in pixel values in the side-to-side direction of an image (the horizontal direction of an image), and performs the edge extraction process through various known methods using second derivatives, Laplacians, and so on for the pixel values in the side-to-side direction (horizontal direction) of the image. However, the edge extraction unit 20 may perform the edge extraction process by detecting an amount of change in pixel values in a top-to-bottom direction of the image (the vertical direction of the image), a diagonal direction, or the like, in addition to the side-to-side direction of the image (the horizontal direction of the image). Furthermore, the direction for the detection of the amount of change in the pixel values for executing the edge extraction process is not limited to a single direction, and may be a plurality of directions.

Meanwhile, more highly-precise edge extraction methods have been proposed, and the edge extraction unit 20 may carry out the edge extraction process using such methods. In sum, any method may be used for the edge extraction process performed by the edge extraction unit 20 as long as it is a method that enables edges to be extracted.

Meanwhile, the edge extraction unit 20 includes a function for extracting only the edges of a subject for which the occurrence of the cardboard cutout effect is to be reduced (this subject is often the primary subject). The edge extraction unit 20 shifts an edge image R (an edge image R obtained as a result of extracting the edge component from the R image) and an edge image L (an edge image L obtained as a result of extracting the edge component from the L image) in the side-to-side direction (the horizontal direction of the image) so that the edges in the R image and the edges in the L image of the primary subject, which is specified using a method not described here, overlap with each other. At this time, the edge extraction unit 20 determines the extent to which the edges of the primary subject in the R image and in the L image overlap, using, for example, a known correlation determination method.

The edge extraction unit 20 extracts common areas of the edge image R and the edge image L in a state in which the edges of the primary subject in the edge image R and the edges of the primary subject in the edge image L overlap the closest. For example, in the case where the edges are expressed as a grayscale from 0 to 255 (where stronger edges have greater values) (that is, the case where the pixel values of the edge image R and the edge image L are from 0 to 255 (that is, are 8-bit data)), it is possible to extract common edges by finding the minimum value between the pixel value in the edge image R and the pixel value in the edge image L at the same coordinates in a state in which the edges of the primary subject in the edge image R and the edges of the primary subject in the edge image L overlap the closest. In other words, assuming that the pixel value of the edge image R at a coordinate location (x,y) is R1(x,y) and the pixel value of the edge image L at the coordinate location (x,y) is L1(x,y) in an image in which the edge image R and the edge image L have been superimposed so that the edges of the primary subject in the edge image R and the edges of the primary subject in the edge image L overlap the closest, a minimum value Min(x,y) between the pixel value in the edge image R and the pixel value in the edge image L is found through the following:

when $R1(x,y) > L1(x,y)$, (1)

$Min(x,y) = L1(x,y)$ when $R1(x,y) \leq L1(x,y)$, (2)

$Min(x,y) = R1(x,y)$

Then, by taking the minimum value Min(x,y) obtained through the above processing as the pixel value at the coordinate location (x,y), the process for extracting the common edge areas can be carried out.

As a result of this processing, the positions of the edge image R and the edge image L are shifted in an image in which the edge image R and the edge image L have been superimposed so that the edges of the primary subject in the edge image R and the edges of the primary subject in the edge image L overlap the closest, and thus edges in which the depth values differ from the primary subject are eliminated. (That is, the positions of the edge image R and the edge image L are shifted in an image in which the edge image R and the edge image L have been superimposed so that the edges of the primary subject in the edge image R and the edges of the primary subject in the edge image L overlap the closest, and thus the stated minimum value Min(x,y) takes on a value that is close to 0; as a result, edges in which the depth values differ from the primary subject are eliminated.)

If approximate depth information (an approximate depth value) is known, edges in which the depth values are different can be further eliminated by the edge extraction unit 20 performing processing based on that depth information (those depth values).

It is desirable to furthermore eliminate edges estimated to be located within edge objects of the primary subject in the edges of the primary subject that remain following the aforementioned processing. For example, it is also possible for the edge extraction unit 20 to perform a process for leaving left end and right end edges of the primary subject and remove edges located in regions therebetween, or for weakening those edge components (that is, reducing the pixel values of areas that form those edges).

Furthermore, it is also possible for the edge extraction unit 20 to perform a process for finding the colors of the R image and the L image and, for example, detecting changes in the color based on hue, saturation, brightness, or the like, leaving the edges in image regions in which the color changes, and removing the edges in image regions in which the color does not change, or for weakening those edge components (that is, reducing the pixel values of areas that form those edges).

Furthermore, it is also possible for the edge extraction unit 20 to perform a person detection process, known as a more highly-precise method, and perform processing for removing edges aside from the ends of the person by referring to the result of the person detection process, or weakening those edge components (that is, reducing the pixel values of areas that form those edges).

Through the aforementioned processing, the edge extraction unit 20 obtains an image in which common edge areas have been extracted (this is referred to as a "common edge image"). The edge extraction unit 20 then obtains the L image common edge image, in which the coordinate locations of the pixels in the obtained common edge image are shifted so as to match the coordinate locations of the pixels in the L image outputted from the image input unit 102. The edge extraction unit 20 also obtains the R image common edge image, in which the coordinate locations of the pixels in the obtained common edge image are shifted so as to match the coordinate locations of the pixels in the R image outputted from the image input unit 102.

The edge extraction unit 20 then outputs the L image common edge image to the second strength generation unit 22 of the L image correction unit 21L in the second image correction unit 21 and outputs the R image common edge image to the second strength generation unit 22 of the R image correction unit 21R in the second image correction unit 21.

Figure 14:
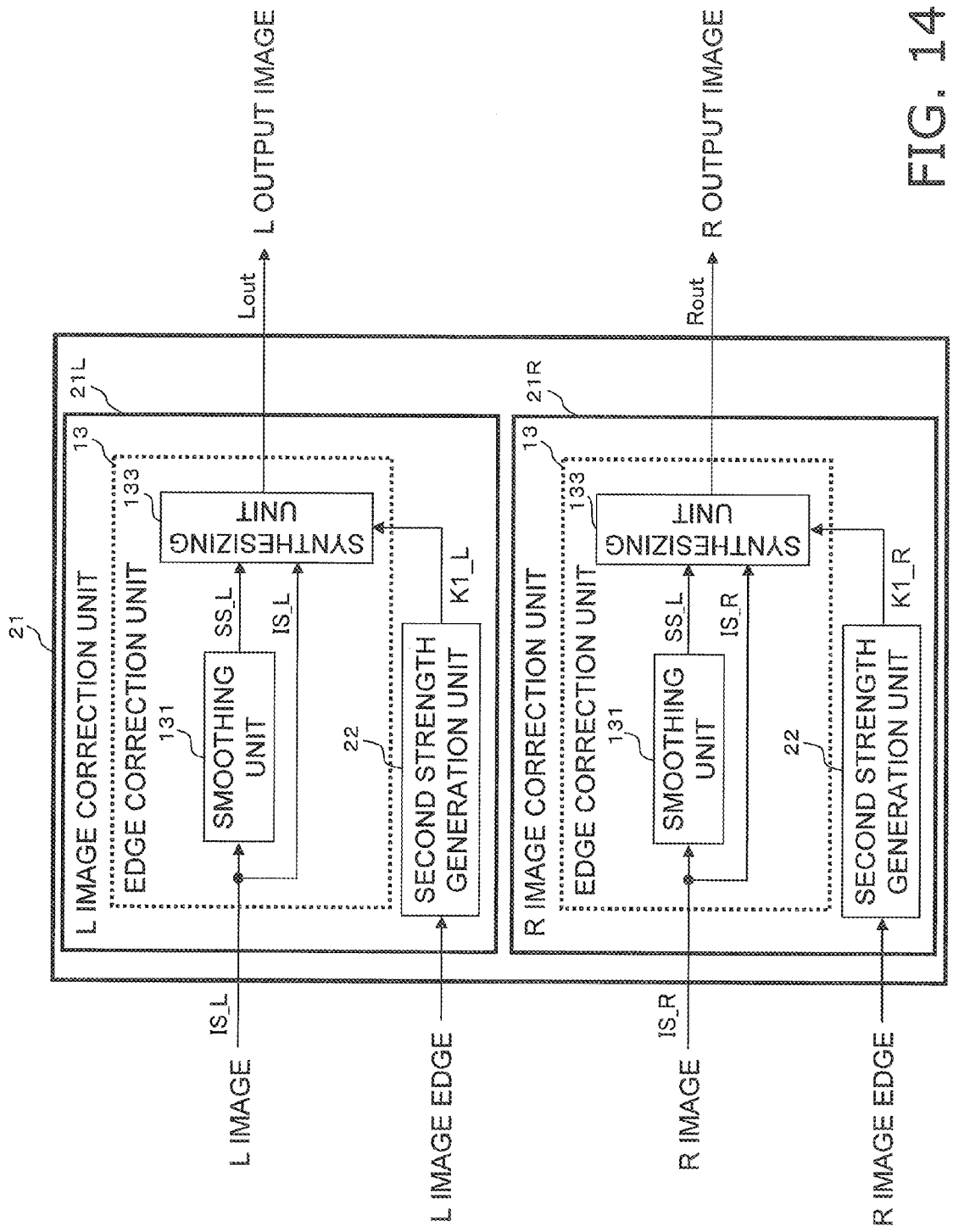
FIG. 14 is a block diagram illustrating an image correction unit 201 according to the second embodiment.

FIG. 14 illustrates the configuration of the second image correction unit 21. As shown in FIG. 14, the second image correction unit 21 includes the L image correction unit 21L and the R image correction unit 21R.

In FIG. 14 as well, elements that are identical to those in the image correction unit 104 shown in FIG. 2 are assigned the same reference numerals, and detailed descriptions thereof will be omitted.

The second strength generation unit 22 is inputted with the L image common edge image outputted from the edge extraction unit 20. The second strength generation unit 22 adjusts and normalizes the levels of the aforementioned edge information in the R image common edge image or the L image common edge image inputted from the edge extraction unit 20 (that is, the pixel values in the R image common edge image or the L image common edge image). For example, the second strength generation unit 22 normalizes the inputted image signal that foams the R image common edge image or the inputted image signal that forms the L image common edge image to a signal in a range of [0:1].

The signal normalized by the second strength generation unit 22 of the L image correction unit 21L is then outputted to the synthesizing unit 133 as the L image strength signal K1_L.

The synthesizing unit 133 of the L image correction unit 21L synthesizes the L image signal SS_L outputted from the smoothing unit 131 with the L image signal IS_L outputted from the image input unit 102 based on the L image strength signal K1_L outputted from the second strength generation unit 22 of the L image correction unit 21L.

Specifically, the synthesizing unit 133 synthesizes the L image signal IS_L and the L image signal SS_L on which the smoothing process has been executed using the L image strength signal K1_L, which is a signal that has been normalized in the range of [0:1], as an internal division ratio, and consequently obtains the output L image signal Lout, through the following formula.

Note that the second strength generation unit 22 generates the L image strength signal K1_L by performing gain adjustment and normalization so that the strongest edges (that is, the maximum pixel values in the common edge image) take on a value of 1.

$$Lout = (1 - K1\_L) \times IS\_L + K1\_L \times SS\_L$$

In this manner, the image signal that has been synthesized by the synthesizing unit 133 is outputted as an L output image.

Accordingly, with the three-dimensional image capturing apparatus 2000 according to the present embodiment, a signal that has been smoothed in the vicinity of the edges of the primary subject is outputted as a result of the execution of the aforementioned processing, and thus a three-dimensional image processed by the three-dimensional image capturing apparatus 2000 according to the present embodiment is a three-dimensional image that has been selectively blurred only in the vicinity of the edges. As a result, the three-dimensional image obtained by the three-dimensional image capturing apparatus 2000 according to the present embodiment is a three-dimensional image in which the occurrence of the cardboard cutout effect and so on is suppressed.

Although the foregoing describes processing on the L image (processing performed by the L image correction unit 21L), it should be noted that the processing performed on the R image (processing performed by the R image correction unit 21R) is the same.

In addition, an "end part region detection unit" is realized by the edge extraction unit 20 and the second strength generation unit 22 of the L image correction unit 21L when processing the L image and is realized by the edge extraction unit 20 and the second strength generation unit 22 of the R image correction unit 21R when processing the R image.

Other Embodiments

Note that the various blocks of the three-dimensional image capturing apparatus described in the aforementioned embodiments may be implemented as single individual chips, or some or all of the blocks may be implemented as a single chip, by employing semiconductor devices such as LSIs. Note that although the term "LSI" is used here, other names, such as IC, system LSI, super LSI, ultra LSI, and so on are used depending on the degree of integration.

Further, the manner in which the circuit integration is achieved is not limited to LSIs, and it is also possible to use a dedicated circuit or a general purpose processor. FPGAs (Field Programmable Gate Arrays) that can be programmed after the LSI manufacture, configurable processors in which the connections, settings, and so on of circuit cells within the LSIs can be reconfigured, or the like may be used as well.

Furthermore, if other technologies that improve upon or are derived from semiconductor technology enable integration technology to replace LSIs, then naturally it is also possible to integrate the functional blocks using that technology. Biotechnology applications are one such foreseeable example.

Some or all of the processing of the functional blocks of the above embodiments can be implemented by a program. In such a case, some or all of the processing of the functional blocks in the above embodiments are run by a central processing unit (CPU) on a computer. A program for performing the various processes is stored on a memory device such as a hard disk or a ROM, and is run on the ROM or read to and run on a RAM.

In addition, the various processes in the aforementioned embodiments may be realized as hardware, or as software (this includes implementations through an OS (operating system), middleware, or a predetermined library). These processes may also be implemented through processes in which the software and hardware run integrated with one another. It goes without saying that it is necessary to adjust the timing at which to execute each process in the case where the three-dimensional image capturing apparatus according to the above embodiments is implemented through hardware. For simplicity's sake, the descriptions in the above embodiments have omitted the details regarding the adjustment of the timing of the various signals that arises in the actual hardware architecture.

In addition, the order of execution in the processing methods of the aforementioned embodiment are not necessarily limited to the descriptions in the aforementioned embodiments, and the order of execution can be interchanged without departing from the spirit of the invention.

A computer program that causes a computer to execute the aforementioned methods and a computer-readable recording medium on which that program has been recorded also fall within the scope of the present invention. Here, a flexible disk, hard disk, CD-ROM, MO, DVD, DVD-ROM, DVD-RAM, BD (Blue-ray Disc), semiconductor memory, and so on can be given as examples of such a computer-readable recording medium.

The stated computer program is not limited to a program stored on the stated recording medium, and may be transmitted via a network or the like such as an electric communication line, a wireless or hard-wired communication line, the Internet, and so on.

In addition, the aforementioned embodiments describe cases in which a stereoscopic image (a left eye image and a right eye image) are obtained (captured) by two image capturing units. However, the invention is not limited thereto, and for example, the left eye image and the right eye image may be obtained in an alternating manner, through time division, by a single image sensor, or the left eye image and right eye image may be obtained by dividing a single image sensor into two image sensor surfaces.

In addition, although the aforementioned embodiments described a configuration in which an R image and an L image are inputted into the image input unit 102, the invention is not limited thereto, and for example, an R image and an L image may be selected from N (where N is a natural number greater than or equal to 2) images of a multiple-viewpoint system, and the selected R image (signal) and L image (signal) may then be inputted into the image input unit 102.

In addition, in the three-dimensional image processing apparatus, the R image and the L image do not necessarily need to be obtained internally. For example, the R image and the L image may be inputted to the three-dimensional image processing apparatus from the exterior.

Likewise, in the three-dimensional image processing apparatus, the R depth information and the L depth information do not necessarily need to be obtained internally. For example, the R depth information and the L depth information may be inputted to the three-dimensional image processing apparatus from the exterior. In this case, the depth obtainment unit 103 can be omitted from the three-dimensional image processing apparatus. In other words, the three-dimensional image processing apparatus may include only the image correction unit 104.

It should be noted that the specific configuration of the present invention is not intended to be limited to the above embodiments in any way, and various modifications and variations can be made without departing from the essential spirit of the invention.

According to the three-dimensional image processing apparatus and three-dimensional image processing method of the present invention, a sense of three-dimensionality and thickness can be restored to a subject and a high-quality three-dimensional image with a low sense of a cardboard cutout effect can be obtained, regardless of the cause of the cardboard cutout effect. Accordingly, the present invention is useful in fields related to three-dimensional images (three-dimensional video), and can be applied in such fields.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the three-dimensional image processing apparatus, three-dimensional image processing method. Accordingly, these terms, as utilized to describe the technology disclosed herein should be interpreted relative to the three-dimensional image processing apparatus, three-dimensional image processing method.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A three-dimensional image processing apparatus that performs an image correction process, the apparatus comprising:
    a left eye image and a right eye image contained in a three-dimensional image obtained using a dual-lens technique or a multiple-viewpoint technique;
    an end part region detector configured to detect as an end part region both:
        a region including an edge on a left side of a subject contained in the left eye image and the right eye image, and
        a region including an edge on a right side of the subject contained in the left eye image and the right eye image; and
    an edge correction unit configured to execute a smoothing process on a region in the end part region of the subject detected by the end part region detector
    wherein:
    the end part region detector is further configured to detect the region including an edge on the left side of the subject as the left end part region and detect the region including an edge on the right side of the subject as the right end part region; and
    the edge correction unit is further configured to execute:
        a smoothing process on the left end part region in the left eye image at a first strength, and execute a smoothing process on the right end part region in the left eye image at a second strength that is a lower strength than the first strength; and
        a smoothing process on the right end part region in the right eye image at a third strength, and executes a smoothing process on the left end part region in the right eye image at a fourth strength that is a lower strength than the third strength.

2. The three-dimensional image processing apparatus according to claim 1, wherein:

the end part region detector includes a depth obtainment unit configured to obtain a left eye distance image and a right eye distance image by obtaining distance information in a three-dimensional space for a subject contained in the left eye image and the right eye image; and the end part region detector further configured to detect the end part region of the subject in both the left eye image and the right eye image based on the distance information of the subject obtained by the depth obtainment unit.

3. The three-dimensional image processing apparatus according to claim 1, wherein:

the end part region detector includes an edge extraction unit configured to, extract an edge of a subject contained in the left eye image and the right eye image from the left eye image and the right eye image; and the end part region detector is further configured to detect the end part region of the subject, in both the left eye image and the right eye image, based on edge information of the left eye image and the right eye image extracted by the edge extraction unit.

4. The three-dimensional image processing apparatus according to claim 1, wherein:

the end part region detector is further configured to detect the region including an edge on the left side of the subject as a left end part region, and detect the region including an edge on the right side of the subject as a right end part region; and the edge correction unit is further configured to execute a smoothing process on the left end part region in the left eye image, and execute a smoothing process on the right end part region in the right eye image.

5. A control method that performs an image correction process for the three-dimensional image processing apparatus according to claim 1, the method comprising:

obtaining a left eye image and a right eye image contained in a three-dimensional image by a dual-lens technique, or a multiple-viewpoint technique via a processor;

detecting both end part regions from the left eye image and the right eye image, the both end part regions being:
a region including an edge on a left side of a subject contained in the left eye image and the right eye image, and
a region including an edge on a right side of the subject contained in the left eye image and the right eye image, as; and smoothing a region in both end part regions of the subject.

* * * * *